United States Patent [19]
Gegner

[11] Patent Number: 5,343,140
[45] Date of Patent: Aug. 30, 1994

[54] ZERO-VOLTAGE-SWITCHING QUASI-RESONANT CONVERTERS WITH MULTI-RESONANT BIPOLAR SWITCH

[75] Inventor: Joel P. Gegner, Oak Park, Ill.

[73] Assignee: Motorola, Inc., Schaumburg, Ill.

[21] Appl. No.: 984,153

[22] Filed: Dec. 2, 1992

[51] Int. Cl.⁵ .................. G05F 1/618; H02M 3/335
[52] U.S. Cl. ............................... 323/222; 323/235; 323/351; 363/16; 363/20
[58] Field of Search ............... 323/282, 235, 271, 222, 323/351; 363/16, 39, 124, 15, 40, 123, 131, 20

[56] References Cited

U.S. PATENT DOCUMENTS

| | | | |
|---|---|---|---|
| 4,720,667 | 1/1988 | Lee et al. | 323/271 |
| 4,720,668 | 1/1988 | Lee et al. | 323/271 |
| 4,841,220 | 6/1989 | Tabisz et al. | 323/282 |
| 4,857,822 | 8/1989 | Tabisz et al. | 323/282 |
| 4,931,716 | 6/1990 | Jovanovic et al. | 323/285 |
| 4,958,121 | 9/1990 | Cuomo et al. | 323/224 |
| 4,999,760 | 3/1991 | Tietema | 363/53 |
| 5,066,900 | 11/1991 | Bassett | 323/224 |

OTHER PUBLICATIONS

State-Plane Analysis of Zero-Current-Switching Resonant DC/DC Power Converters, Marian K. Kazimierczuk and William D. Morse, IEEE Transactions On Power Electronics, vol. 4, No. 2, Apr. 1989.

Zero-Voltage Switching Technique on DC/DC Converters, Kwang-Hwa Liu and Fred C. Y. Lee, IEEE Transactions On Power Electronics, vol. 5, No. 3, Jul. 1990.

*Primary Examiner*—Steven L. Stephan
*Assistant Examiner*—Adolf Berhane
*Attorney, Agent, or Firm*—John M. England, Jr.

[57] ABSTRACT

A compact, high frequency, zero voltage switching quasi-resonant converter with a multi-resonant, bi-polar switch includes a resonant switch (S), a first diode ($D_p$) in parallel with the switch (S), a second diode ($D_s$) in series with the switch (S), first ($C_{r1}$) and second ($C_{r2}$) resonant capacitors and a resonant inductor ($L_r$). The first resonant capacitor ($C_{r1}$) is operatively connected to the resonant switch (S) such that any voltage change across the first resonant capacitor ($C_{r1}$) necessitates a corresponding voltage change across the resonant switch (S). The second resonant capacitor ($C_{r2}$) is operatively connected to the second diode ($D_s$) such that any voltage change across the second resonant capacitor ($C_{r2}$) necessitates a corresponding voltage change across the second diode ($D_p$). The resonant inductor ($L_r$) is operatively connected in series with the resonant switch (S) such that any current change through the resonant inductor ($L_r$) necessitates corresponding changes in the sum of currents flowing through the first resonant capacitor ($C_{r1}$), first diode ($D_p$), and the resonant switch (S), and the sum of currents flowing through the second resonant capacitor ($C_{r2}$) and the second diode ($D_s$).

6 Claims, 25 Drawing Sheets

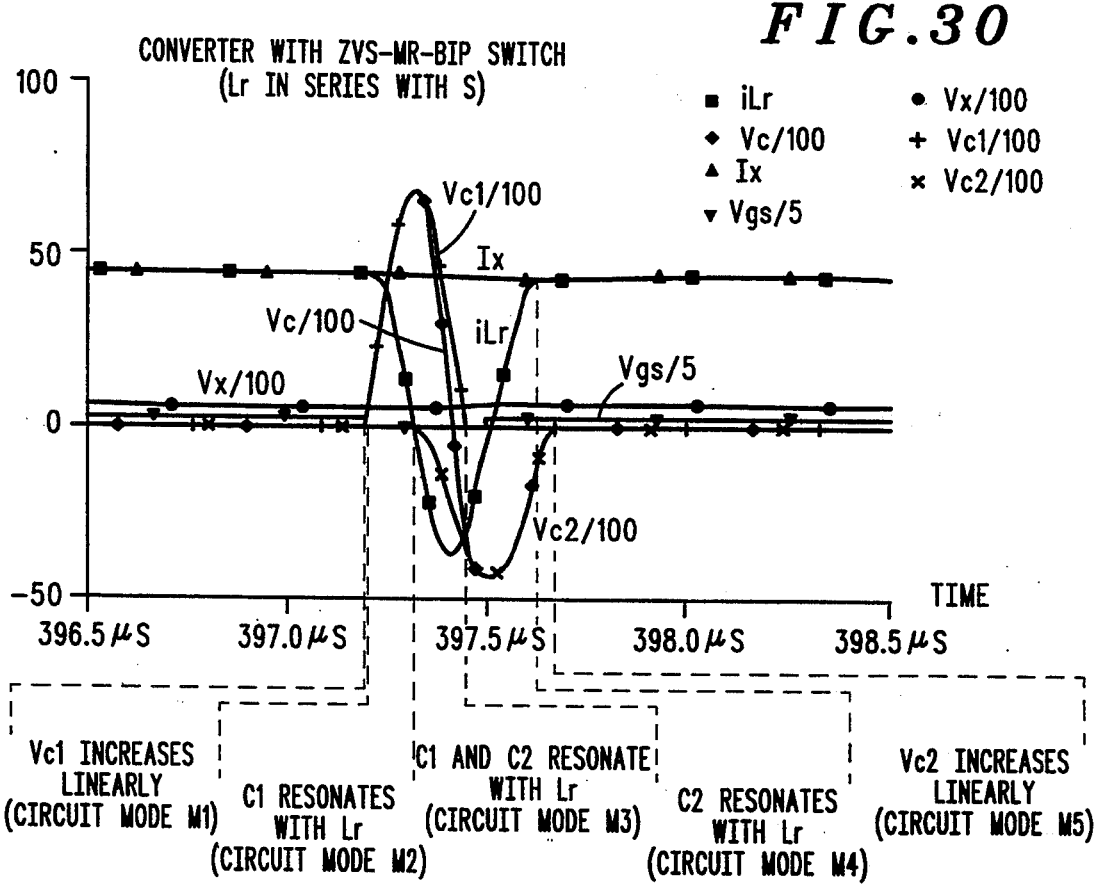
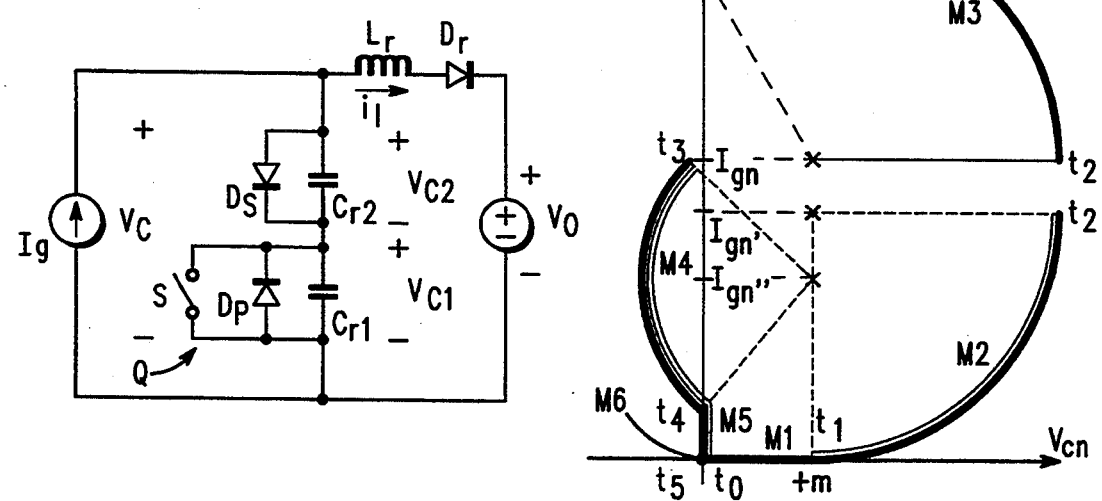

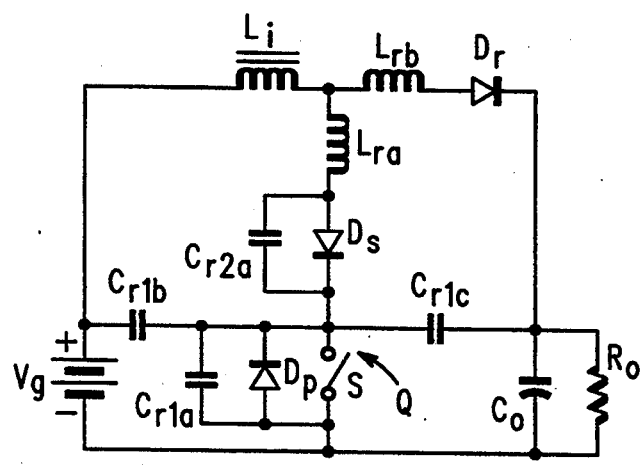
*FIG.45A*
*FIG.45B*
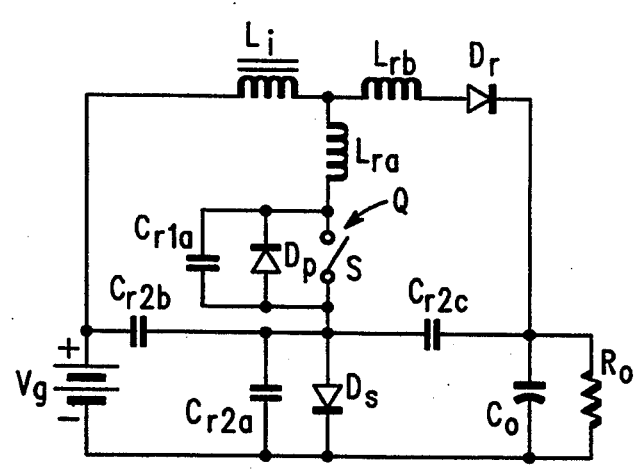
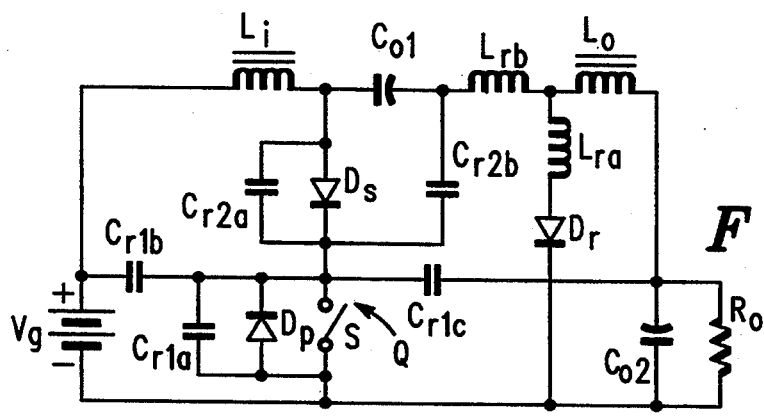
*FIG.46A*
*FIG.46B*
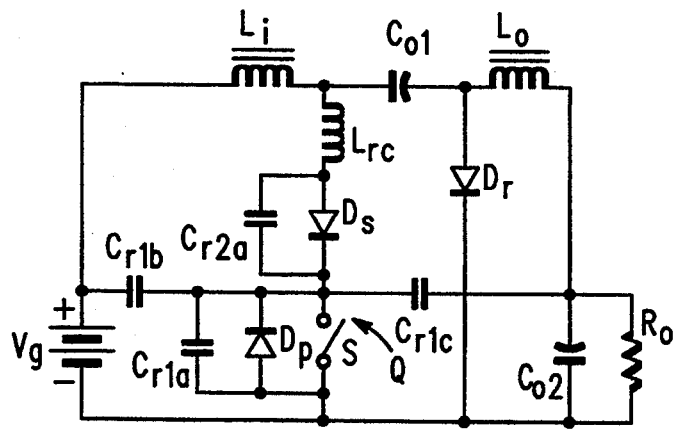

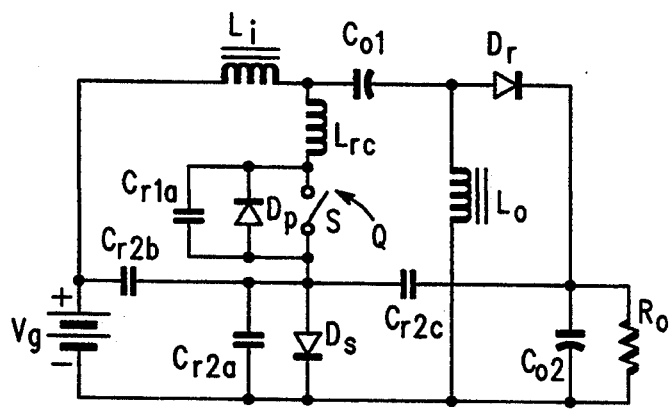
*FIG.47C*
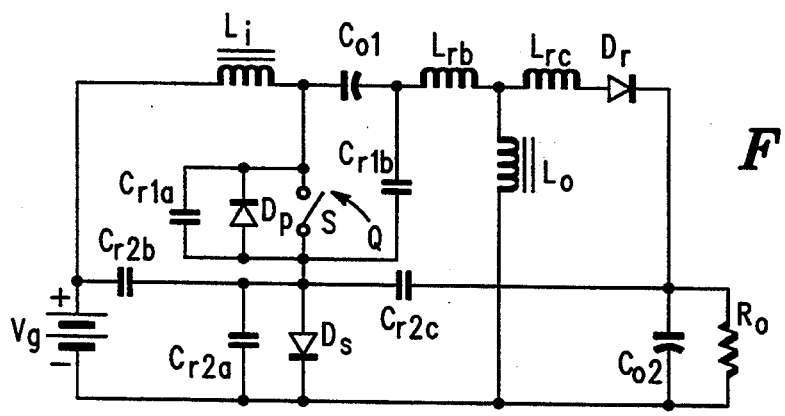
*FIG.47D*
*FIG.48A*
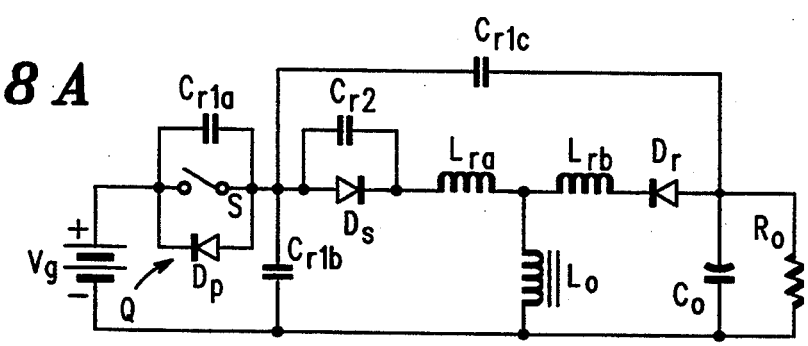
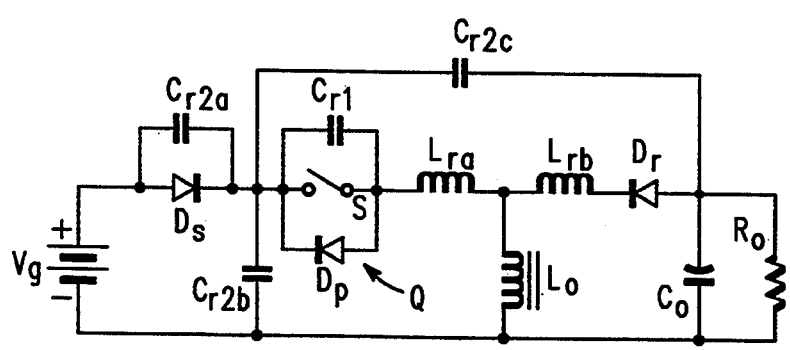
*FIG.48B*

ZERO-VOLTAGE-SWITCHING QUASI-RESONANT CONVERTERS WITH MULTI-RESONANT BIPOLAR SWITCH

FIELD OF THE INVENTION

This invention relates generally to switching power converters and more particularly to providing an improved soft switching apparatus for use therewith.

BACKGROUND OF THE INVENTION

Switching Power Converters have for many years served as a viable means for electrical energy conversion. By using non-power-dissipative semi-conductor switching elements relatively high power conversion efficiencies have been achieved. Unfortunately, although semiconductor devices are operated in a manner similar to that of switches, undesirable energy dissipation internal to these conventional devices occurs during turn-on and turn-off transitions. Such losses are due to the simultaneous existence of voltage across and current through the semiconductor devices during commutation. Because these losses occur at each switch transition, high frequency operation correspondingly yields low power conversion efficiencies.

Since higher switching frequencies generally result in smaller reactive components and improved dynamic performance, mechanisms for minimizing switching losses have long been sought after. For example, in conventional Pulse-Width-Modulated (PWM) switch-mode converters, energy recovery snubbers have been used to "soften" the switching of semiconductor devices. A technique known as "soft-switching" has also been implemented in switching power converters. This conventional technique seeks to eliminate switching losses by altering the switching conditions in such a way that the switch current or switch voltage is zero at the time of commutation.

In this way "Zero-Current-Switching" (ZCS) or "Zero-Voltage-Switching" (ZVS) respectively, is attempted. To implement this switching mechanism, an L-C network is added around the switch so that the switch current or switch voltage may be kept at a constant zero value during switch commutation. Conventional switch-mode converters using this type of soft-switch are known as Quasi-Resonant Converters.

ZCS may be attempted when an inductor is placed in series with the semiconductor switch FIG. 1a. Since the energy stored in an inductor cannot change instantaneously, therefor neither can the current through it change instantaneously. If energy resonates between the inductor and the capacitor when the switch is on, then the switch may be opened losslessly (in theory) at a time when the inductor has dumped all of its energy to the capacitor. Once the switch is open, the inductor current remains zero, and the switch can turn on with zero-current through it.

ZVS may be attempted when a capacitor is placed in parallel with the semiconductor switch (FIG. 2b and 2c). Since energy stored in the capacitor cannot change instantaneously, therefor neither can the voltage across it change instantaneously. If energy resonates between the capacitor and the inductor when the switch is off, then the switch may be closed losslessly (in theory) at a time when the capacitor has dumped all of its energy to the inductor. Once the switch is closed, the capacitor is shorted and its voltage remains zero, thus allowing zero-voltage-turn-off for the switch.

In the conventional soft-switching techniques discussed above, the switch element must commute off (for ZCS) or on (for ZVS) at the instant in time when the inductor current or capacitor voltage crosses zero, respectively. This switching is extremely difficult to implement in practice since the switch current or switch voltage must be sensed by a control circuit which must in turn react quickly enough to actively commute the switch before the zero-switching opportunity has passed. Switches can be designed to commute to a first state actively, but commute to a second state either actively or passively. For "Zero Current" (ZC) switching, a switch is needed which will passively (i.e. naturally) turns off. For "Zero Voltage" (ZV) switching, a switch is needed which will passively turn on.

Diodes have long been conventionally used as passive switches, turning on when forward biased, and turning off when reverse biased. They may be connected to an active switch in one of two ways: in series, or in parallel. An active switch with a series diode is referred to as an uni-directional switch since it can conduct current in only one direction FIG. 1b. If the active switch is connected with a parallel diode, it is termed a bi-directional switch since current may flow in two possible directions FIG. 1c. Conventional ZCS converters possessing these types of switches are said to operate in a half-wave mode and full-wave mode, respectively. Full-wave mode refers to the inductor current resonating to negative as well as positive values, and half-wave mode refers to the inductor current flowing in only one direction.

Both uni-directional and bi-directional switches can turn off passively, however an uni-directional switch turns off passively when the inductor current tries to flow negatively through the switch, whereas a bi-directional switch turns off passively when the inductor current tries to flow positively through the switch. Here switch refers to the composite switch formed by the active semiconductor switch and the passive diode switch. For a uni-directional switch, the active switch must remain on until the series diode blocks the current thus permitting ZC turn-off. For a bi-directional switch, the active switch must be turned off while the inductor current flows negatively through the parallel diode so that the current will be blocked once it attempts to flow positively through the diode. It should be noted that for a bi-directional switch, ZV turn-off exists in addition to or in place of ZC turn-off. This occurs since the negative inductor current flows through the parallel diode effectively producing a near zero voltage drop across the active switch when the switch turns off.

Similar to ZC switching, ZV switching may be implemented using two possible switch configurations: an active switch with a passive switch in parallel, or an active switch with a passive switch in series (FIGS. 2b and 2c). These composite switches are referred to as uni-polar and bi-polar switches, respectively. A uni-polar switch has the property of permitting the capacitor voltage to be of only one polarity, whereas the bi-polar switch allows the capacitor voltage to be both positive and negative in value. ZVS converters utilizing bi-polar switches or uni-polar switches are said to operate in a full-wave or half-wave mode, respectively.

Unlike ZC switching, full-wave and half-wave modes with regards to ZV switching refer to the shape of the capacitor voltage waveform, and not the inductor current waveform. Both bi-polar and uni-polar switches may turn on passively, however, an uni-polar switch turns on passively when the capacitor voltage tries to build negatively across the switch, whereas a bi-polar switch turns on passively when the capacitor voltage tries to build positively across the switch. For a uni-polar switch, the active switch must remain off until the parallel diode conducts thus permitting ZV turn-on. For a bi-polar switch, the active switch must turn on when the capacitor voltage builds negatively across the series diode so that the switch can turn on passively when the capacitor voltage attempts to become positive. It should be noted that for a bi-polar switch, the turn-on transition definitely occurs while the current through the active switch is zero (the series diode is reverse biased,) thus guaranteeing ZC turn-on. This condition may exist in addition to, or in place of ZV turn-on.

Both ZVS and ZCS conventional techniques seek to decrease switching losses and attempt to permit high efficiency operation at higher switching frequencies. However, only ZVS truly reduces switching loss. The reason for this is that some must take place during turn-on of a ZCS switch. Parasitic capacitance across the semiconductor switch stores energy while the switch is off, and releases stored energy internally when the switch is turned on. For this reason, high frequency operation of such conventional converters, even with the attendant switching losses, is possible only with ZVS converters in actual practice.

As mentioned above, conventional switch-mode converters using ZC or ZV switching techniques have been referred to as Quasi-Resonant Converters (QRC's). QRC's are controlled differently from switch-mode converters. Load and line regulation in a QRC are achieved by varying the switching frequency of the switch rather than the pulse width. It is known that QRC's operating in a full wave mode exhibit significantly improved load regulation over those operating in a half wave mode. This is so for both ZC and ZV switching converters.

In conventional ZVS converters, full-wave operation is achieved by placing a diode in series with the active switch to allow the resonant capacitor voltage to build both positively and negatively (It is assumed that the only capacitance in the circuit is an external one placed across the composite switch comprised of the diode and the active switch). Unfortunately, parasitic capacitance exists independently across both the diode and the active switch (usually a MOSFET). The parasitic MOSFET capacitance inhibits true ZVS since the series diode turns off before all the charge in the MOSFET capacitance has had a chance to escape. As an unfortunate result, the same turn-on losses exist as in ZCS, and high frequency operation of conventional ZVC converters is not feasible.

SUMMARY OF THE INVENTION

The instant invention includes a rectifier for directing power from the power source to the load and optionally includes a filtering inductor and capacitor. In the preferred embodiment the subject converter includes a resonant switch, a first diode in parallel with the switch, a second diode in series with the switch, first and second resonant capacitors and a resonant inductor. The first resonant capacitor is operatively connected to the resonant switch such that any voltage change across the first resonant capacitor necessitates a corresponding voltage change across the resonant switch. Further, the second resonant capacitor is operatively connected to the second diode such that any voltage change across the second resonant capacitor necessitates a corresponding voltage change across the second diode. Still further, the resonant inductor is operatively connected in series with the resonant switch such that any current change through the inductor necessitates a corresponding change in the sum of currents flowing through the first resonant capacitor, first diode, and the resonant switch, and the sum of currents flowing through the second resonant capacitor and the second diode.

DESCRIPTION OF DRAWINGS

FIG. 30 graphically shows the operational waveforms of the converter of FIG. 28.

FIG. 31 is a simplified schematic diagram of the circuit of FIG. 14.

FIG. 32 is a state plane diagram describing the operation of the converter circuit of FIG. 14 according to the present invention.

FIGS. 45a–b are schematic diagrams of a Boost converter utilizing the ZVS-MR-BIP switch according to the present invention.

FIGS. 46a–d are schematic diagrams of a 'Cuk converter utilizing the ZVS-MR-BIP switch according to the present invention.

FIGS. 47a–d are schematic diagrams of a Sepic converter utilizing the ZVS-MR-BIP switch according to the present invention.

FIGS. 48a–b are schematic diagrams of a Buck/Boost converter utilizing the ZVS-MR-BIP switch according to the present invention.

DETAILED DESCRIPTION OF THE PREFERRED EMBODIMENT

The present invention provides a variable frequency, zero-voltage switched, multi-resonant convert for receiving power from a power source and providing power to load that satisfies the long-felt need of eliminating switching losses encountered by conventional converters. A novel ZV multi-resonant bi-polar switch which is the subject of the present invention makes profitable use of both series diode and active switch capacitances which have plagued the prior art. The novel switch provides desirable load and line regulation similar to that of ZCS QR full wave converters using bi-directional switches and also provides the necessary true ZVS needed for high frequency operation as will be set forth in detail below.

Figure 1A:
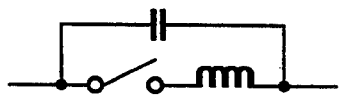
FIG. 1a is a schematic circuit diagram of a prior art Zero Current Switch.
Figure 1B:
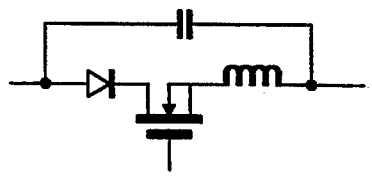
FIG. 1b is a schematic circuit diagram of a prior art Zero Current Unidirectional Switch utilizing a series diode.
Figure 1C:
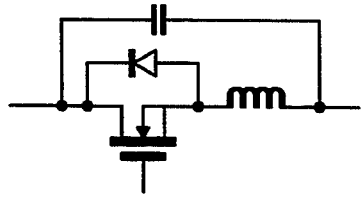
FIG. 1c is a schematic circuit diagram of a prior art Zero Current Bi-directional Switch utilizing a parallel diode.
Figure 2A:
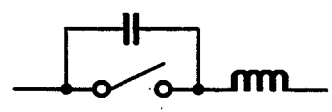
FIG. 2a is a schematic circuit diagram of a prior art Zero Voltage Switch.
Figure 2B:
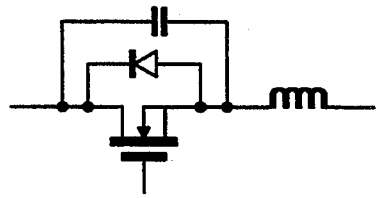
FIG. 2b is a schematic circuit diagram of a prior art Zero Voltage Uni-polar Switch utilizing a parallel capacitor.
Figure 2C:
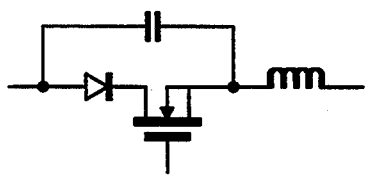
FIG. 2c is a schematic circuit diagram of a prior art Zero Voltage Bi-polar Switch utilizing a series diode.
Figure 3:
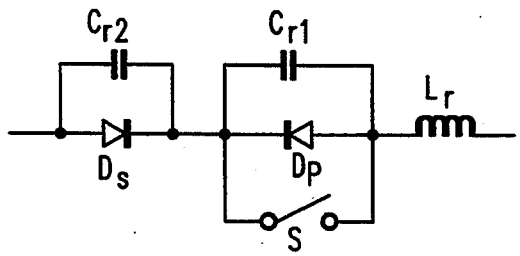
FIG. 3 is a schematic circuit diagram of a novel ZV multi-resonant bi-polar switch according to the present invention.
Figure 4:
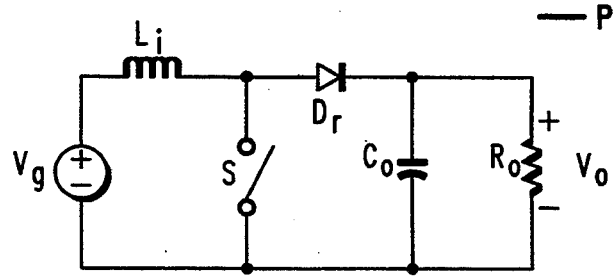
FIG. 4 is a schematic diagram of a prior art Boost Switch Mode Converter.

Attention is directed to the preferred embodiment of the present invention (FIG. 3). Turning initially to FIG. 4 which shows a conventional Boost Switch-Mode converter the following is apparent. A voltage source $V_g$ is connected in series with an input filter inductor $L_i$ and an active switch S. An output filter includes a parallel connected capacitor $C_o$ and load $R_o$ coupled across switch S via a rectifying diode $D_r$. Upon closing S, the input source voltage $V_g$ is applied entirely across the inductor $L_i$, thus causing a positive di/dt thereby increasing the energy stored in the inductor $L_i$. During this time, diode $D_r$ is reversed biased, and energy to the load $R_o$ is supplied by filter capacitor $C_o$. Upon opening switch S, diode $D_r$ conducts, and current flows through the inductor $L_i$ replenishing energy to capacitor $C_o$. During this time, the di/dt of the inductor must be negative in order for energy to flow from the inductor $L_i$ to the load $R_o$. Thus, the voltage gain $V_o/V_g$ of such a conventional converter must be greater or equal to one.

Figure 5:
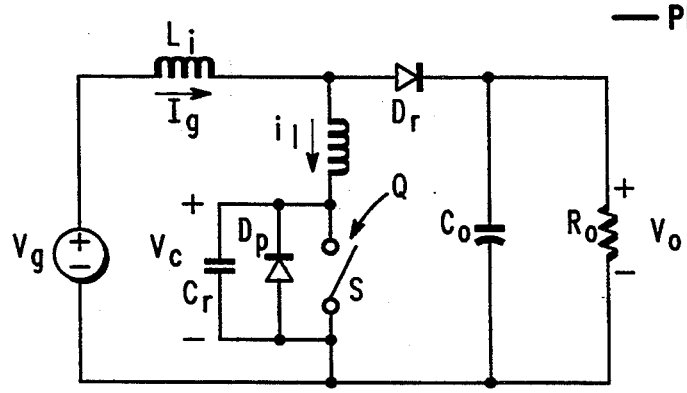
FIG. 5 is a schematic diagram of a prior art ZVS Quasi-resonant Converter utilizing a uni-polar switch for half wave mode operation.
Figure 6:
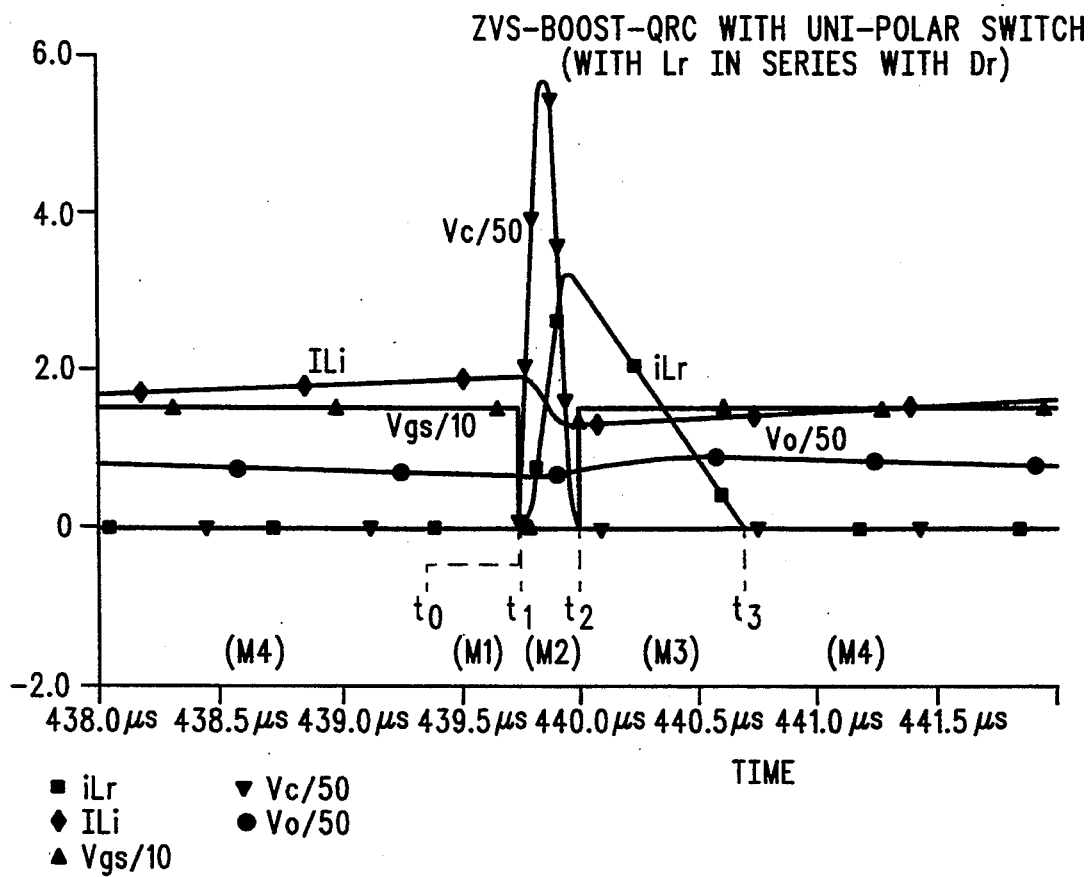
FIG. 6 is a waveform analysis of the prior art converter shown in FIG. 5.

FIG. 5 shows a conventional ZVS Quasi-Resonant converter" using a uni-polar switch S. The switch S may be implemented using a MOSFET (Q), and the required parallel diode will then consist of the parasitic body diode $D_p$ of the MOSFET. A resonant capacitor $C_r$ is placed in parallel with the switch S and diode $D_p$, and a resonant inductor $L_r$ is connected in series with the switch S. Both filter elements $L_i$ and $C_o$ are assumed large enough so that the current through $L_i$ and the voltage across $C_o$ can be approximated as constant over a switching cycle. Operation is explained in light of the waveforms shown in FIG. 6.

At $t_0$, the switch S is opened. Prior to $t_0$, it is assumed that the current through $L_r$ is equal to the input current $I_g$, and therefor the rectifying diode $D_r$ is off. When the switch S is turned off at time $t_0$, the input current bypasses the switch S through resonant capacitor $C_r$, causing its voltage to rise linearly. At $t_1$, the voltage on the capacitor $C_r$ reaches the output voltage $V_o$ at which point the diode $D_r$ becomes forward biased and turns on. Charge continues to flow into the capacitor $C_r$, however the current through the resonant inductor $L_r$ begins to decrease sinusoidally since a negative di/dt exists across it. The voltage on the capacitor $C_r$ continues to increase until the inductor current reaches zero, at which point the voltage begins to decrease. At time $t_2$, the resonant capacitor voltage has reached zero, and the current through the inductor $L_r$ is still negative. At this time the body diode $D_p$ of the switch S begins to conduct causing the current to bypass the resonant capacitor $C_r$. The current in the resonant inductor $L_r$ now increases linearly since a constant voltage of $V_o$ exists across it. While the current is still negative, the MOSFET Q may be turned on with zero-voltage across it. At time $t_3$ the resonant inductor current has reached a value of $I_g$, and the rectifying diode $D_r$ turns off.

Figure 7:
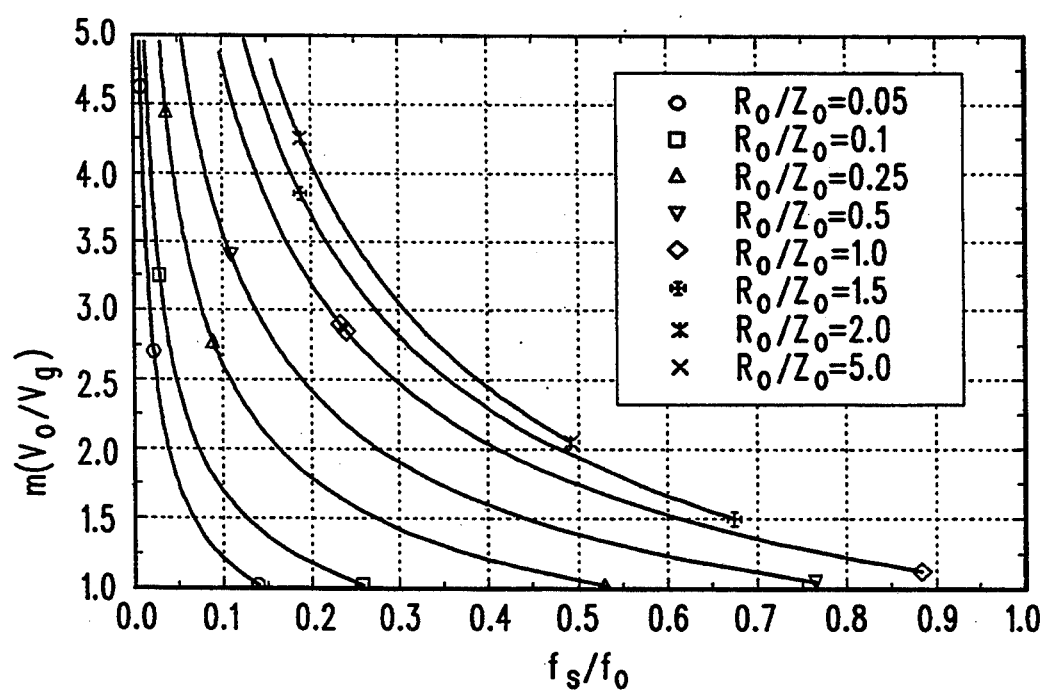
FIG. 7 graphically shows voltage gain versus the normalized switching frequency of the prior art converter of FIG. 5.

The converter remains in this state until the next cycle is initiated by turning the switch S off. This state may be referred to as the on-state, since it corresponds to the state of the switch-mode boost converter in which the switch is on. In both switch-mode and ZVS-QR converters, the on-time may be as long or as short as desired. However, off-time of the ZVS-QR converter is determined by the time it takes for the resonant inductor current to resonant from a value of $+I_g$ through a negative peak value, and finally to decrease linearly to a zero value. In other words, the duration of the off-time for this type of conventional converter is not arbitrary, but is a function of the resonant L-C tank as well as the load $R_o$ and the input and output voltages $V_g$ and $V_o$. As a result, the steady-state voltage of this converter is not load independent. The voltage gain versus normalized switching frequency is shown in FIG. 7 where the normalized load $Q_1$ has been used as a parameter.

Figure 8:
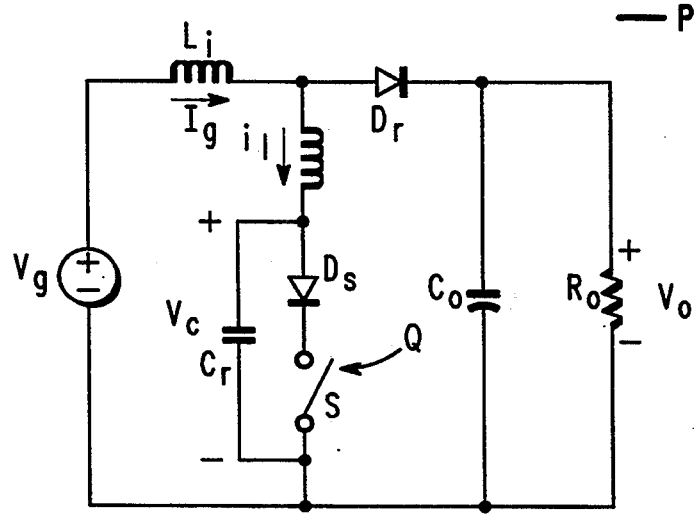
FIG. 8 is a schematic diagram of a prior art ZVS Quasi-resonant Boost converter utilizing a bi-polar switch for full wave mode operation.
Figure 9:
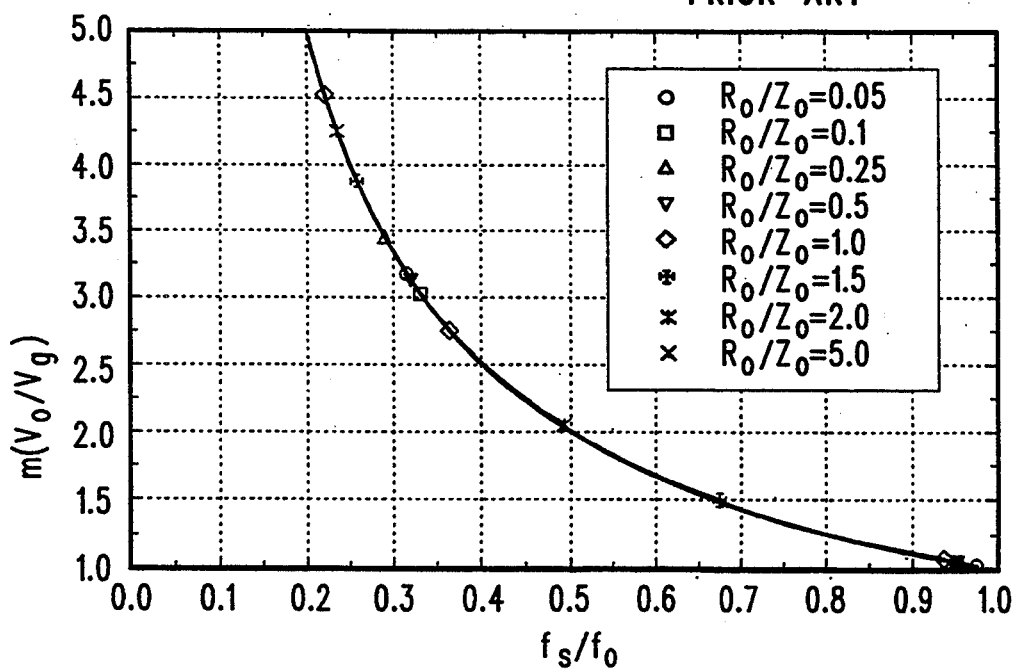
FIG. 9 graphically shows the steady state voltage gain of the prior art converter shown in FIG. 8.
Figure 10:
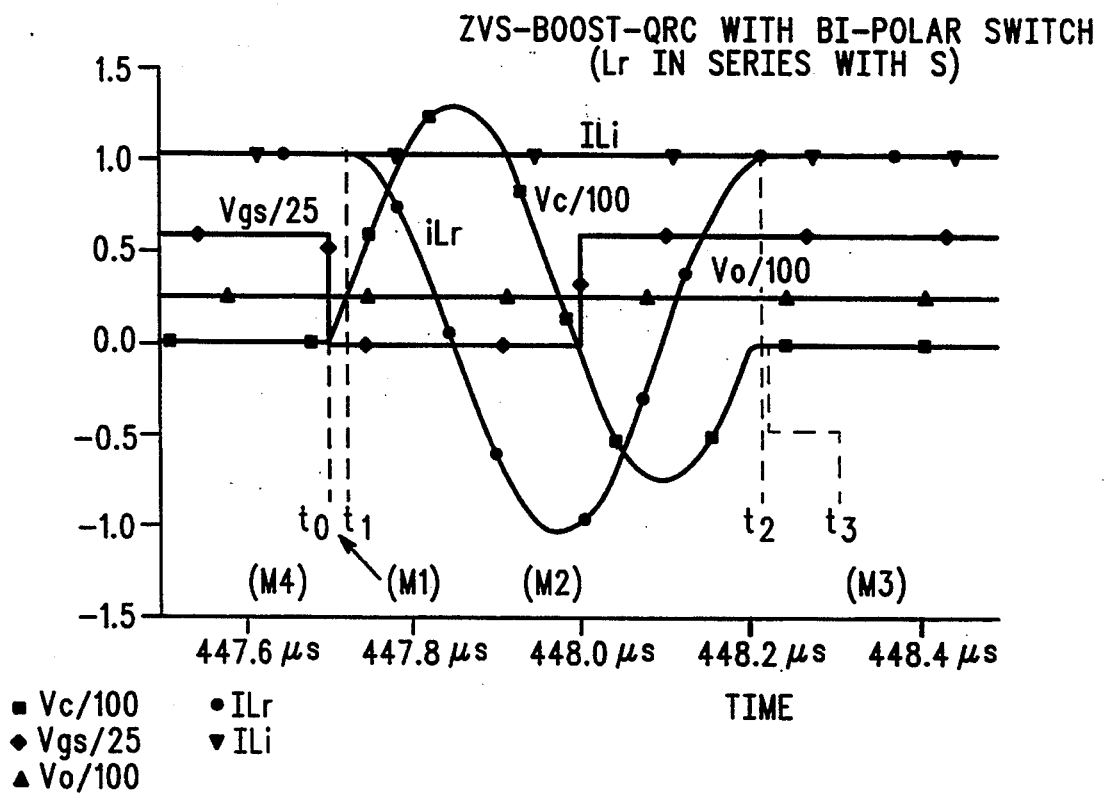
FIG. 10 shows a waveform analysis of the prior art converter shown in FIG. 8.

The converter steady-state voltage gain for a conventional ZVS-QR boost converter using a bipolar switch is shown in FIG. 9. The converter circuit of FIG. 8 is identical to the ZVS-QR boost converter of FIG. 5 with the exception of the diode $D_p$ being relocated to be in series with the switch S instead of in parallel with it. It can be clearly seen that the converter possesses voltage gain characteristics which are nearly independent of the output load $V_o$. This result can be understood in light of the converter waveforms of FIG. 10.

At $t_0$, the switch S is turned off and input current $I_g$ flows through the capacitor $C_r$ increasing its voltage linearly. At time $t_1$, the voltage on the capacitor $C_r$ reaches $V_o$, and the rectifying diode $D_r$ turns on. The inductor $L_r$ and the capacitor $C_r$ resonate together, and the voltage on the capacitor $C_r$ reaches a positive peak value and begins to decrease once the inductor current has changed polarity. The capacitor $C_r$ voltage then decreases to zero and resonates to a negative peak value at which point the inductor current changes polarity again.

While the capacitor $C_r$ voltage is negative, the switch S may be turned on with zero-voltage across it since the series diode $D_S$ blocks the voltage. At $t_2$, the capacitor voltage reaches zero and attempts to rise positively but is blocked by the turn-on of the series diode $D_S$. Resonant inductor current flows through the switch S and series diode $D_S$ bypassing the capacitor $C_r$. At this time a constant di/dt exists across the resonant inductor $L_r$ and inductor current increases linearly until it reaches a value of $I_g$ at time $t_3$. At time $t_3$, the diode $D_r$ also turns off, and the converter remains in this state until the next cycle is initiated by turning the switch S off again. The fundamental different between the half-wave and full-wave mode of operation is the difference in amount of time between times $t_3$ and $t_4$.

In the full-wave mode, the inductor current has resonated nearly a full cycle time between times $t_2$ and $t_3$ so that the energy stored in the inductor is nearly the same as when the switch (S) was initially turned off. As a result, the amount of time between times $t_3$ and $t_4$ is small and does not contribute significantly to the overall switching period. In the half-wave mode however, the inductor current resonated just over a half cycle and is near its peak value when the capacitor $C_r$ voltage reaches zero and the parallel diode $D_p$ turns on. This current value is far from the value of $I_g$ at the turn-off time of the switch (S), and subsequently the time between $t_3$ and $t_4$ becomes a substantial portion of the overall switching period.

Since the inductor current value at time $t_3$ is strongly dependent upon the load, the time between $t_3$ and $t_4$ is also dependent upon the load. In effect, this time contributes to the equivalent off-time of the switch (S), and therefor affects the converter voltage gain. In practice, the switch S would contain a parallel diode due to the parasitic body diode of the MOSFET. Since parasitic capacitance also exists, charge remains trapped when the inductor current reverses polarity and turns off the series diode $D_S$. Consequently, when the switch (S) is turned back on, the energy stored in the parasitic capacitance is dissipated internally as the capacitor is discharged. This unfortunately prevents the use of conventional ZVS QRC's operating in full-wave mode at high frequencies since turn-on losses quickly become too significant.

Figure 11:
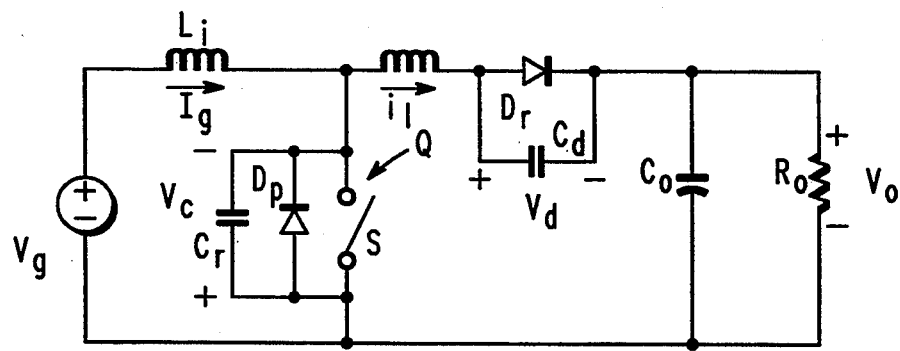
FIG. 11 is a schematic diagram of a prior art ZVS-MR-QRC Boost converter.
Figure 12:
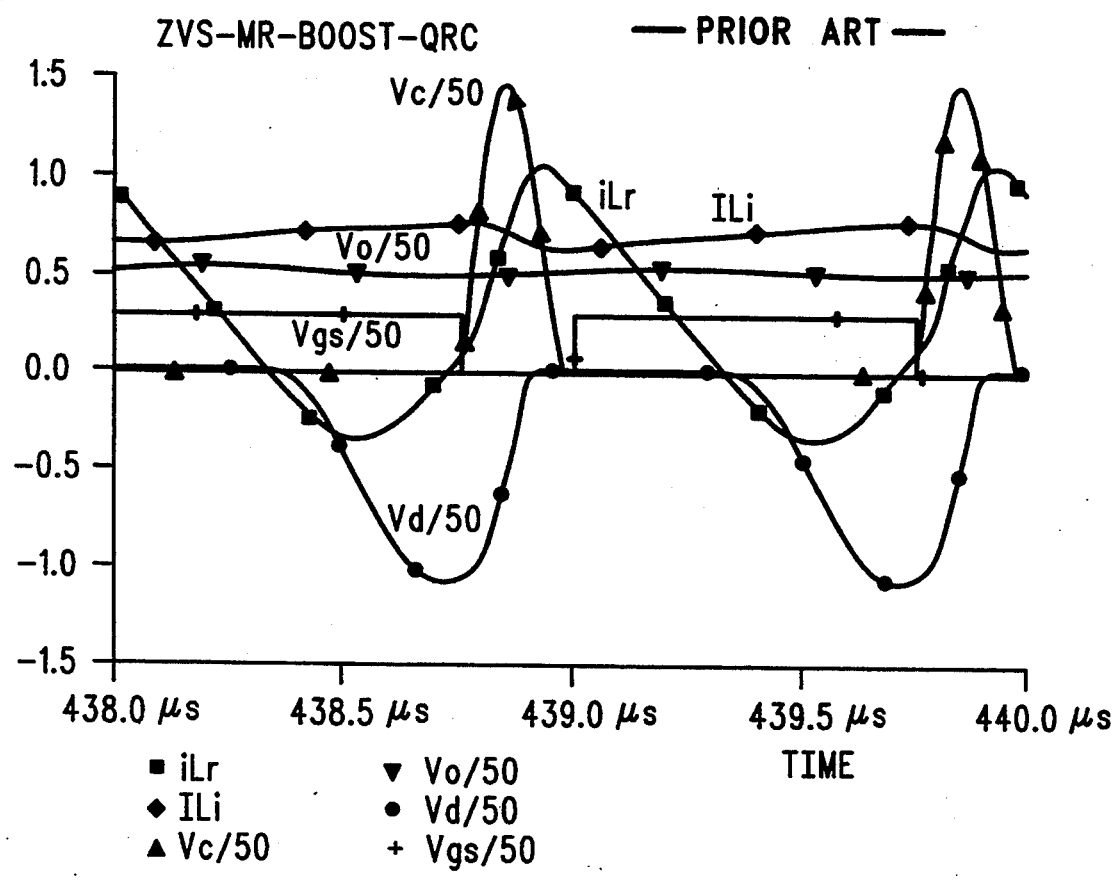
FIG. 12 shows a waveform analysis of the prior art converter of FIG. 11.

FIG. 11 shows a conventional Zero-Voltage-Switching, Multi-Resonant, Quasi-Resonant Boost Converter (ZVS-MR-QRC). This converter is identical to the conventional ZVS Half-Wave Mode Quasi-Resonant Converter with the exception of resonant capacitor $C_{r2}$ being added across the rectifying diode $D_p$. Diode junction capacitance otherwise contributing to unwanted parasitic oscillations is profitably used to achieve zero-voltage-switching for both the active switch and the passive rectifying diode $D_r$. The Boost converter utilizing the ZVS-MR-BIP switch of the invention is distinct from conventional converters by virtue of the parallel combination of $D_S$ and $C_{r2}$ in series with the active switch. Waveforms of the conventional ZVS-MR Boost QRC are shown in FIG. 12.

EXEMPLARY OPERATION OF CONVERTERS USING THE ZERO-VOLTAGE-SWITCHING BI-POLAR MULTI-RESONANT SWITCH OF THE PRESENT INVENTION

The novel Zero-Voltage-Switching Multi-Resonant Bi-Polar Switch (ZVS-MR-BIP Switch) shown in FIG. 3, as set forth by the present invention in the preferred embodiment, is distinct from the conventional ZVS-BIP Switch found in the family of ZVS Full-Wave Mode operated Quasi-Resonant Converters as will now be discussed. Two resonant capacitors, (discussed below) one across the active switch (e.g. MOSFET), and the other across the series passive switch (i.e. diode) are implemented. As mentioned previously, in the conventional bi-polar ZVS switch, a single resonant capacitor is placed across the series combination of the active and passive switches thus ignoring the individual capacitances of each semiconductor device.

Although the conventional switch methodology was previously referred to as zero-voltage-switching, it's turn-on characteristics do not exhibit a true zero-voltage condition. Both diodes and MOSFETs possess parasitic capacitances. In fact, capacitance exhibited by a MOSFET is typically larger than that of most diodes. As a result, the energy in the capacitor is trapped and dissipates internally to the MOSFET. This loss is similar to Zero-Current turn-on loss and is also very detrimental to high frequency switching. This problem, inherent in conventional converters, is solved by the present invention as follows.

The ZVS-MR-BIP switch provided by the instant invention distributes the resonant capacitance across both the series diode and MOSFET thus making use of unavoidable parasitic capacitances. If the capacitance on the series diode is designed to be larger than that of the MOSFET, then charge in the MOSFET capacitance can successfully recirculate through the series diode capacitance prior to turning on the MOSFET. If the series diode capacitance is large enough, all of the charge on the MOSFET capacitance may recirculate causing the body diode of the MOSFET to conduct and allow a time window over which the MOSFET may be turned on with true zero-voltage.

Figure 13:
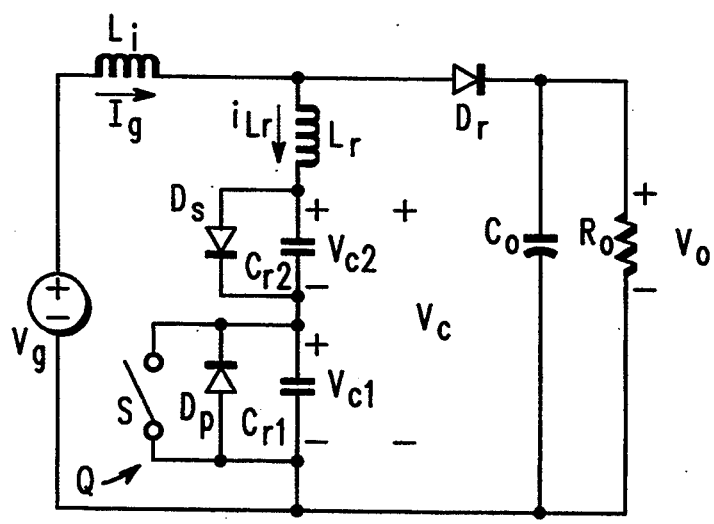
FIG. 13 is a schematic diagram of one implementation of a novel boost converter utilizing a ZVS-MR-BIP switch according to the preferred embodiment of the present invention.

The ZVS-MR-BIP switch of the present invention may be implemented in a number of different converter topologies including but not limited to the family of switch-mode converters. FIG. 13 shows one implementation of ZVS-MR-BIP boost converter according to the present invention. It is assumed that the input inductor $L_i$ is large enough so that the current flowing through it over a switching cycle may be assumed to be approximately constant and equal to a value of $I_g$. It is noted that the current through the rectifying diode $D_r$ is equal to the current through the resonant inductor $L_r$ with the addition of a DC offset value of $I_g$. As a result, the inductor $L_r$ may be relocated to be in series with the rectifying diode $D_r$ without effecting the circuit operation or performance.

Figure 14:
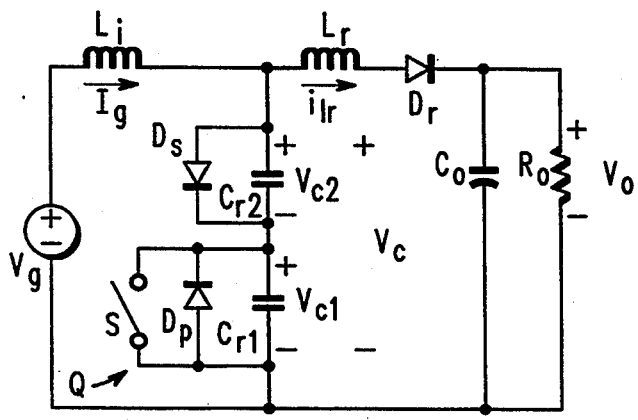
FIG. 14 is a schematic diagram of the converter of FIG. 13 according to the present invention with the resonant inductor in series with the rectifying diode.
Figure 15A:
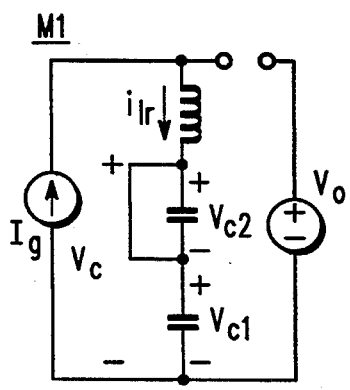
FIG. 15 sets forth schematic diagrams 15a–15d which show the topological circuit modes of the novel circuit shown in FIG. 13.
Figure 15B:
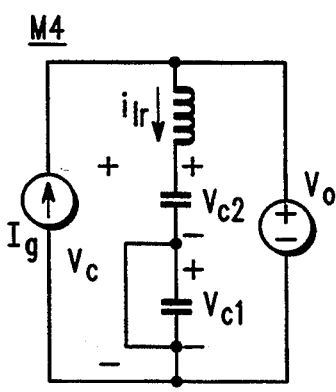
Figure 15C:
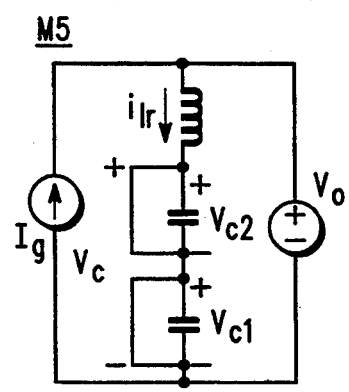
Figure 15D:
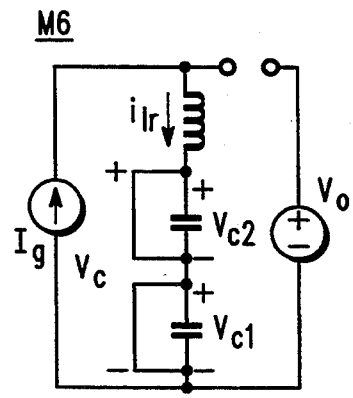
Figure 15E:
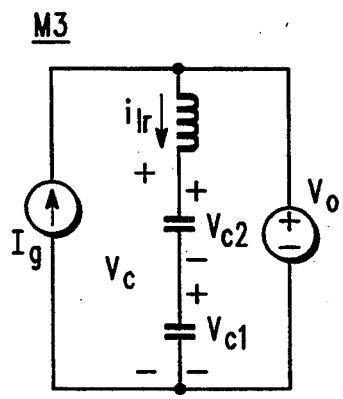
Figure 15F:
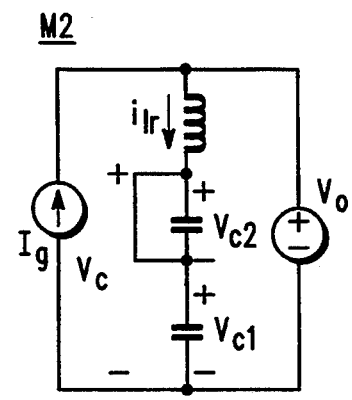

FIG. 14 shows the boost converter of FIG. 13 where inductor $L_r$ is in series with the rectifying diode $D_r$. In the converters shown in FIG. 13 and 14 it is assumed that the RC time constant of the output lowpass filter ($C_o$ and $R_o$) is large enough in order to maintain the output voltage $V_o$ approximately constant over a switching cycle. Consequently, the lowpass filter may be replaced by an equivalent voltage sink (not shown) with a value of $V_o$, equal to the average value across the load $R_o$, and filter capacitor $C_o$.

Figure 16:
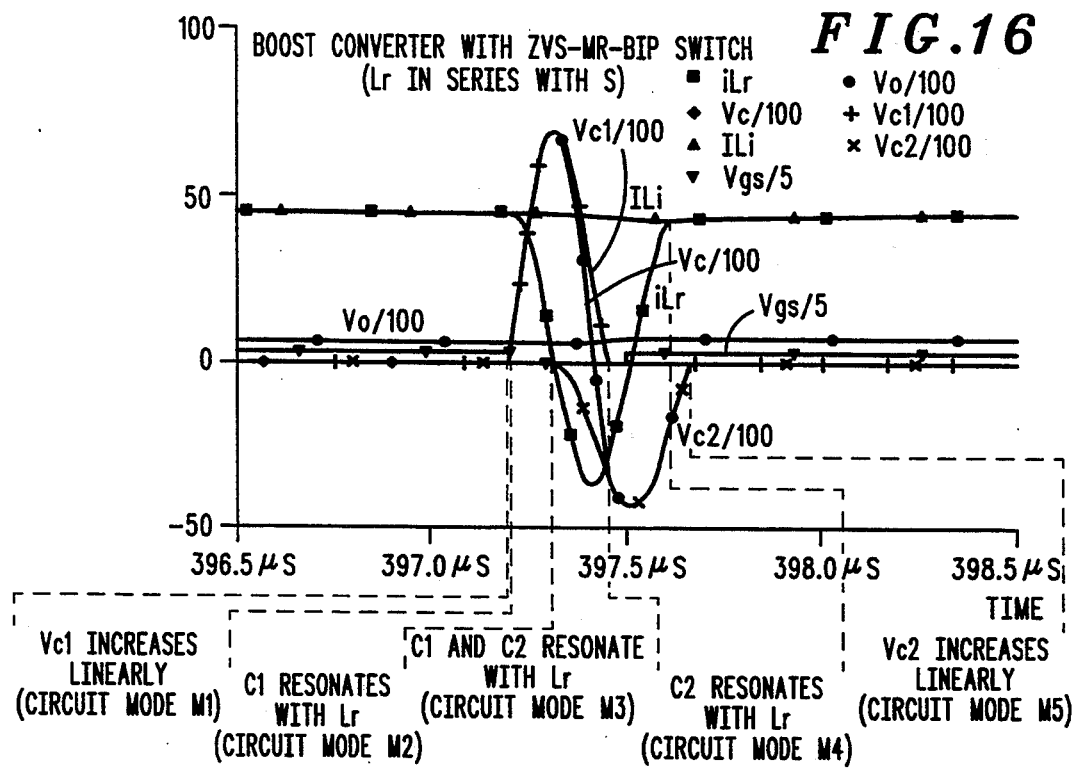
FIG. 16 shows operational waveforms of the converter of FIG. 13.
Figure 17A:
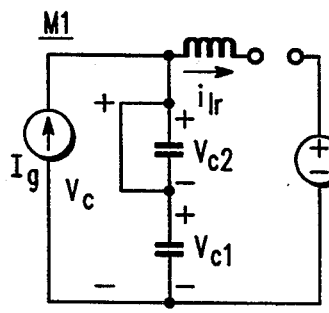
FIG. 17 sets forth schematic diagrams 17a–17d which show topological circuit modes of the novel circuit shown in FIG. 14.
Figure 17B:
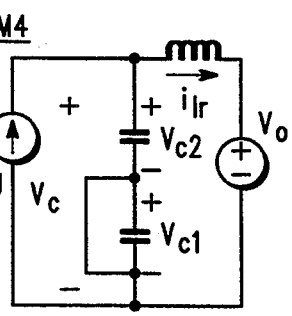
Figure 17C:
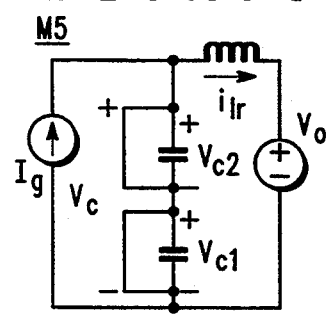
Figure 17D:
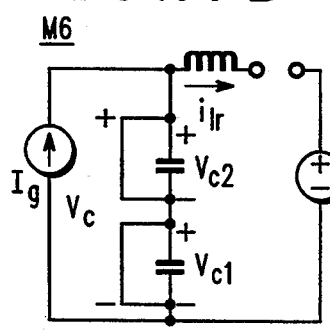
Figure 17E:
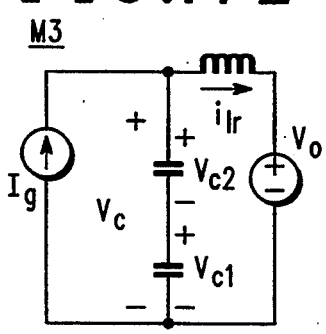
Figure 17F:
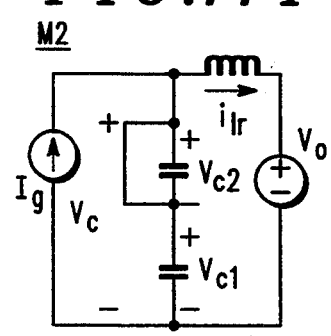

The novel operation of the ZVS-MR-BiP Boost converter of FIG. 13 may be better understood by referring to the representative converter topological circuit modes M1–M6 of FIG. 15 along with the operational waveforms set forth in FIG. 16. At the beginning of the switching cycle, it is assumed that rectifying diode $D_r$ is off and switch S and series diode $D_s$ are on and have a constant current value of $I_g$. At time $t_0$, the switch S is turned off and current bypasses the switch S flowing into the capacitor $C_{r1}$ causing its voltage to increase linearly. At time $t_1$, the voltage on the capacitor $C_{r1}$, reaches a value of $V_o$, the output voltage. The rectifying diode $D_r$ turns on, and the output voltage sink $V_o$ is connected in parallel with the switch S. Energy stored in the inductor $L_r$ now resonates into capacitor $C_{r1}$, causing it to reach a peak voltage value. At time $t_2$, inductor current reverses polarity and the voltage on $C_{r1}$ begins to decrease.

Simultaneously, the series diode $D_s$ turns off and the voltage on the capacitor $C_{r2}$ begins to increase negatively. During this time, all three reactive elements resonate together. At time $t_3$, the voltage on the capacitor $C_{r1}$ has decreased to zero, and the body diode $D_p$ of the MOSFET Q turns on. Negative current flowing through the inductor $C_1$ maintains the body diode $D_p$ on long enough for a control circuit (not shown) to turn the MOSFET Q on with zero-voltage. Although the capacitor $C_{r1}$ is shorted, the capacitor $C_{r2}$ still resonates with the inductor Lr, and continues to do so until the inductor current again flows positively and reaches the input current value of $I_g$. At time $t_4$, the rectifying diode $D_r$ turns off, causing a constant current $I_g$ to flow through the inductor $L_1$ and the capacitor $C_{r2}$. This causes the voltage on capacitor $C_{r2}$ to decrease linearly in magnitude to zero. At time $t_5$, the series diode $D_s$ turns on as the capacitor voltage on capacitor $C_{r2}$ attempts to become positive. The voltage on both capacitors $C_{r1}$ and $C_{r2}$ remains at zero, and the current through the inductor $C_1$ remains constant and equal to $I_g$ until a new switching cycle is initiated at time $t_0+T_s$ when the switch S is again turned off.

As long as the switch S remains on, a constant di/dt exists across the input inductor $L_i$, and energy from the source $V_g$ flows into it causing the current to increase. Since it is assumed that the inductor $L_i$ is large, the increase in the input current during this time will be small resulting in a small ripple current superimposed on a DC value. The additional energy that is stored in the input inductor $L_i$ during this time flows to the load during time $t_1$ through $t_4$.

The novel ZVS-MR-BIP boost converter of FIG. 13 may also be modified to become the novel converter K of FIG. 14 by relocating the resonant inductor $L_r$ to be in series with the rectifier diode $D_r$. The operation of the converter K is similar to the converter J of FIG. 13. At the beginning of the switching cycle, it is assumed that rectifying diode $D_r$ is off and the switch S and the series diode $D_s$ are on and are carrying a constant current value of $I_g$. The current through the resonant inductor $L_r$ is zero.

Figure 18:
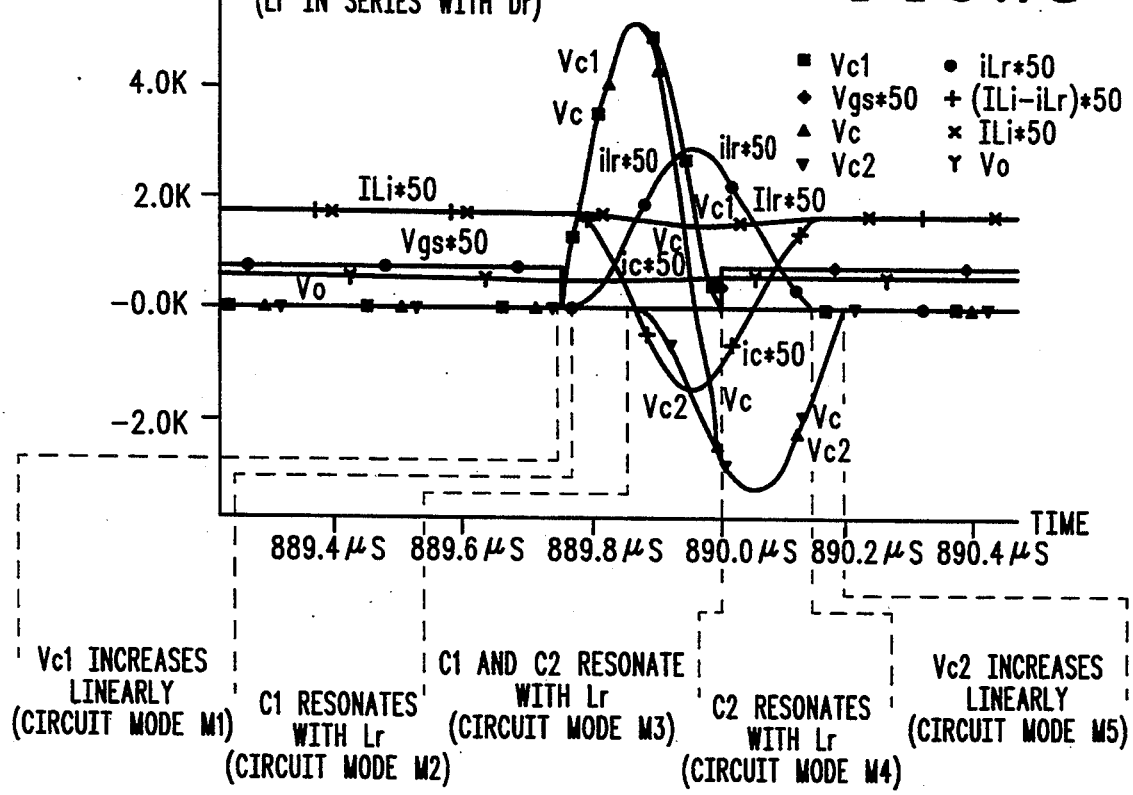
FIG. 18 graphically shows operational waveforms of the circuit configurations of FIG. 17.

Referring to the converter topological circuit modes of FIG. 17 along with the operational waveforms of FIG. 18, it is shown that at time $t_0$, the switch S is turned off and the current bypasses the switch S thereby flowing into the capacitor $C_{r1}$ to cause the voltage thereon to increase linearly. At time $t_1$, the voltage on the capacitor $C_{r1}$ reaches a value of $V_o$, the output voltage, the rectifying diode $D_r$ turns on, and the positive terminal of the output voltage sink $V_o$ is connected to the resonant inductor $L_r$. Energy stored in the resonant capacitor $C_{r1}$ now resonates into the resonant inductor $L_r$, causing the capacitor voltage to reach a peak value. At time $t_2$, the inductor current reaches a value of $I_g$—the input current source value—and the voltage on the capacitor $C_{r1}$ begins to decrease. Simultaneously, the series diode $D_s$ turns off and the voltage on the capacitor $C_{r2}$ begins to increase negatively.

During this time, all three reactive elements resonate together. At time $t_3$, the voltage on the capacitor $C_{r1}$ has decreased to zero, and the body diode $D_p$ of the MOSFET (Q) turns on. As long as current flowing through the resonant inductor $L_r$ remains above a value of $I_g$, the body diode $D_p$ remains on and a control circuit (not shown) turns on the MOSFET with zero-voltage. Although the capacitor $C_{r1}$ is shorted, the capacitor $C_{r2}$ still resonates with the inductor $L_r$, and continues to do so until the inductor current reaches a value of zero. At time $t_4$, the rectifying diode $D_r$ turns off causing a constant current $I_g$ to flow through the capacitor $C_{r2}$. This causes the voltage on the capacitor $C_{r2}$ to decrease linearly in magnitude to zero. At time $t_5$, the series diode $D_s$ turns on as the capacitor voltage on the capacitor $C_{r2}$ attempts to become positive. The voltage on both capacitors $C_{r1}$ and $C_{r2}$ remains at zero, and the current through the inductor $L_r$ remains zero until a new switching cycle is initiated at time $t_0+T_s$ when the switch S is again turned off.

As mentioned previously, another advantage of the novel converter using a ZVS-MR-BIP switch cell according to the present invention is that good load and line regulation are not substantially degraded in exchange for zero-voltage turn-on and turn-off conditions.

Figure 19:
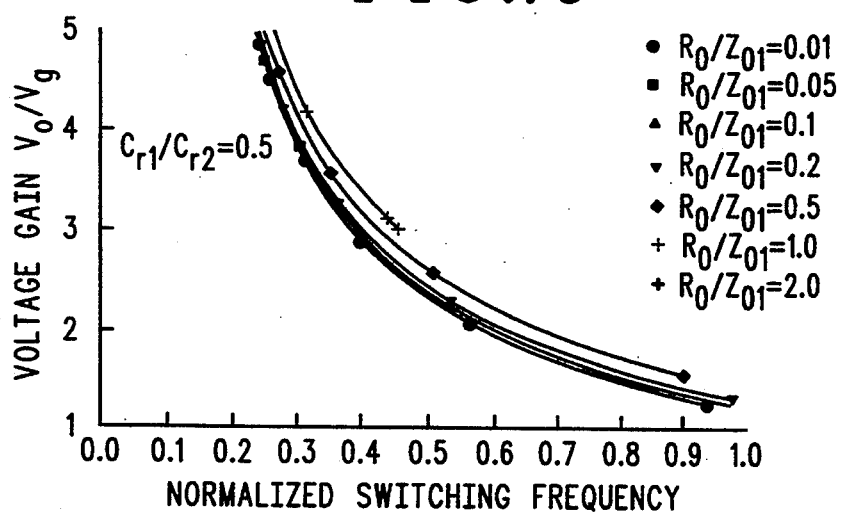
FIGS. 19 & 20 graphically show the converter voltage gain versus normalized switching frequency of the ZVS-BIP multi-resonant converters of FIGS. 13 and 14 for two exemplary capacitor ratio values.
Figure 20:
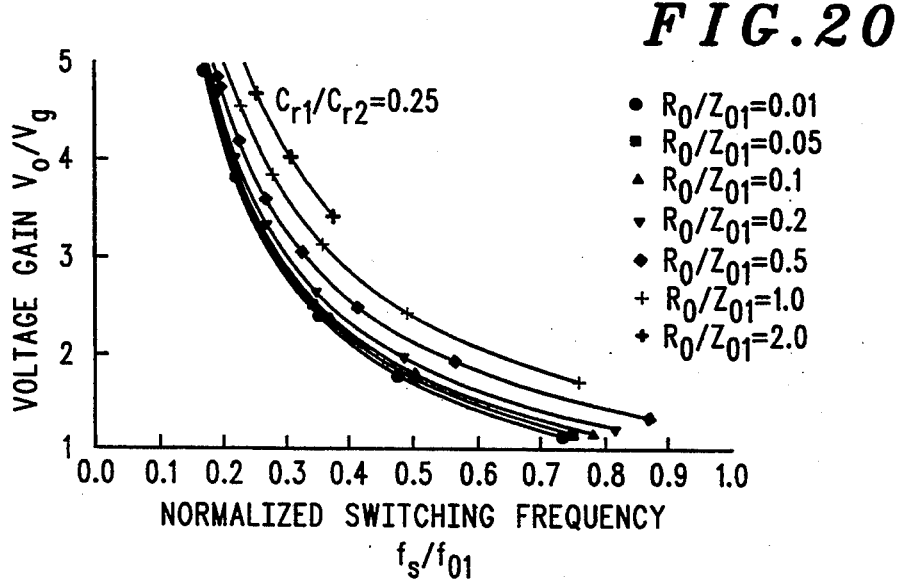

FIGS. 19 and 20 show the novel converter voltage gain $V_o/V_g$ of the Boost converter using the ZVS-MR-BIP switch provided by the instant invention. Voltage gain is plotted against the normalized switching frequency with the normalized load and capacitor ratio constant k as parameters.

The ZVS-MR-BIP switch cell of the invention may be implemented as a "Buck" converter in a fashion similar to that of the Boost converter. Assuming that the output filter inductor Lo is large enough so that the current flowing through it over a switching cycle is approximately constant and equal to a value of Io. Consequently, the lowpass filter consisting of the inductor $L_o$ and the load $R_o$ may be replaced by an equivalent current sink (not shown) with a value of $I_o$, equal to the average current value through the load $R_o$ and the filter inductor $L_o$.

Figure 21:
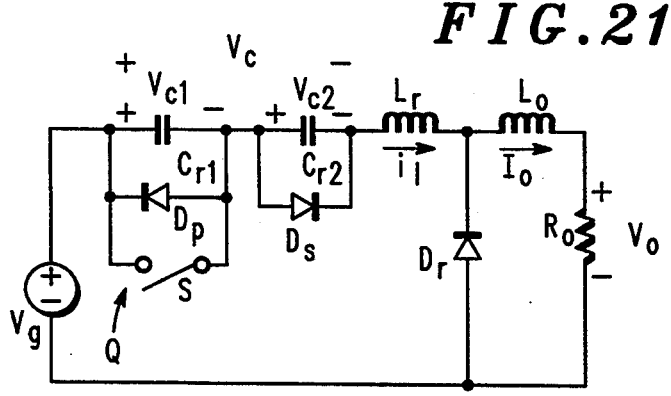
FIG. 21 is a schematic diagram of a novel ZVS-BIP multi-resonant Buck converter according to the present invention.
Figure 22:
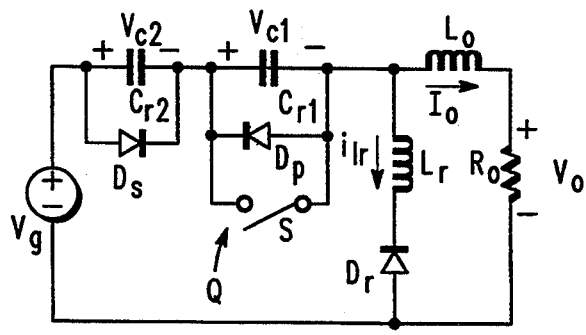
FIG. 22 is a schematic diagram of the Buck converter of FIG. 21 with the resonant inductor in series with the free wheeling diode.
Figure 23B:
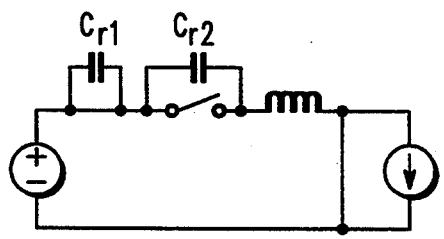
FIG. 23 sets forth the topological circuit modes of FIGS. 23a–23d which show representative configurations of the novel circuit shown in FIG. 21.
Figure 23A:
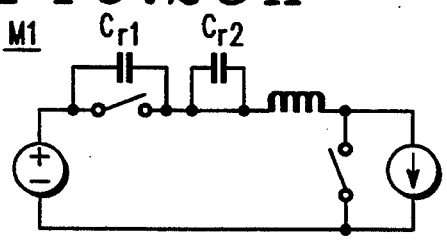
Figure 23C:
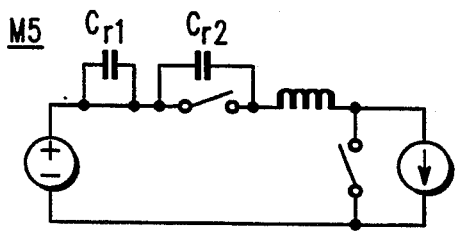
Figure 23D:
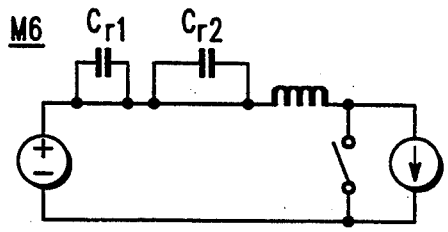
Figure 23E:
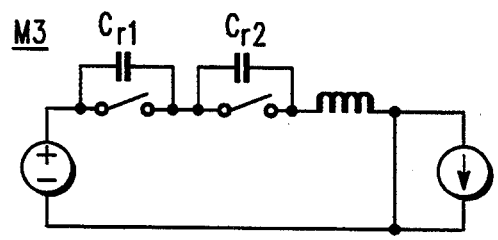
Figure 23F:
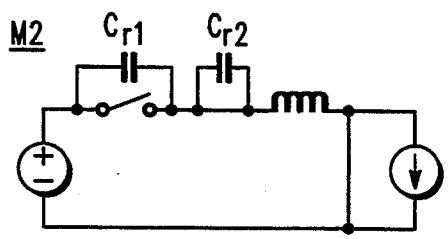

Similar to the ZVS-MR-BIP boost converter, note that the current through the free-wheeling rectifying diode $D_r$ is equal in magnitude to the current through the resonant inductor $L_r$ with the addition of a DC offset value of $-I_o$. As a result, the resonant inductor $L_2$ may be relocated to be in series with the free-wheeling diode $D_r$ without affecting the circuit operation or performance. FIGS. 21 and 22 show these exemplary configurations of the ZVS-MR-BIP Buck converter according to the present invention.

Figure 24:
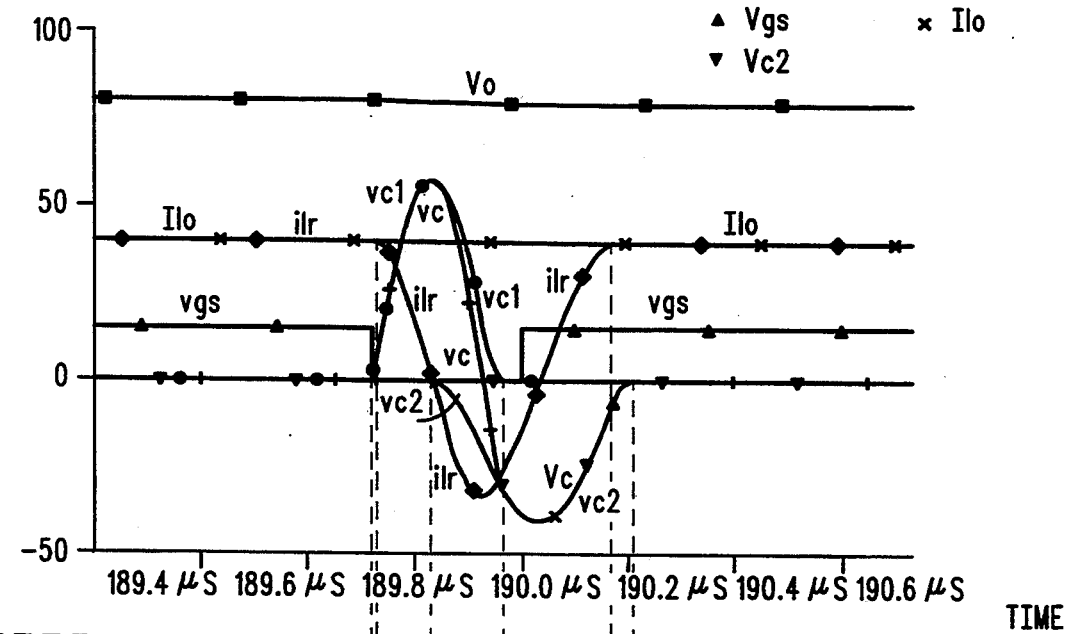
FIG. 24 graphically shows the operational waveforms of the circuit configurations of FIG. 21

The operation of the Buck converter of FIG. 21 may be described as follows: At the beginning of a switching cycle, it is assumed that free-wheeling diode $D_r$ is off and the switch S and the series diode $D_s$ are on and are carrying a constant current Io. The resonant inductor $L_r$ also carries a current value Io. Referring to the topological circuit modes of FIG. 23 along with the operational waveforms of FIG. 24, at time $t_0$, the switch S is turned off and the current bypasses the switch S, flowing into the capacitor $C_{r1}$ causing its voltage to increase linearly. At time $t_1$, the voltage on the capacitor $C_{r1}$ reaches a value of $V_g$, the input voltage. The free-wheeling diode $D_r$ turns on, and the input voltage source $V_g$ is connected in parallel with the switching cell. Energy stored in the inductor $L_r$ now resonates into the capacitor $C_{r1}$, causing its voltage to reach a peak value. At time $t_2$, the inductor current reverses polarity and the voltage on the capacitor $C_{r1}$ begins to decrease. At the same time, the series diode $D_s$ turns off and the voltage on the capacitor $C_{r2}$ begins to increase negatively.

During this time, all three reactive elements resonate together. At time $t_3$, the voltage on the capacitor $C_{r1}$ has decreased to zero, and the body diode $D_p$ of the MOSFET turns on. Negative current flowing through the inductor $L_r$ maintains the body diode $D_p$ on long enough for a control circuit (not shown) to turn the MOSFET (Q) on with zero-voltage. Although the capacitor $C_{r1}$ is shorted, the capacitor $C_{r2}$ still resonates with inductor $L_r$ and continues to do so until the inductor current again flows positively and reaches the output current value of $I_o$. At $t_4$, the rectifying diode $D_r$ turns off causing a constant current $I_o$ to flow through the inductor $L_r$ and the capacitor $C_{r2}$. This causes the voltage on the capacitor $C_{r2}$ to decrease linearly in magnitude to zero. At $t_5$, the series diode $D_s$ turns on as the capacitor voltage on the capacitor $C_{r2}$ attempts to become positive. The voltage on both the capacitors $C_{r1}$ and $C_{r2}$ remains at zero, and the current through the inductor $L_r$ remains constant and equal to Io until a new switching cycle is initiated at time $t_0+T_s$ when the switch S is again turned off.

A number of novel electrically isolated converters are contemplated using the ZVS-MR-BIP switching cell of the present invention. One such novel circuit is the ZVS-MR-BIP "Fly Back Converter" of FIG. 25, which utilizes both the leakage inductance and magnetization inductance of the transformer (T) to achieve proper circuit operation. Leakage inductance is used as the resonant inductor of the ZVS-MR-BIP switching cell, and the magnetization inductance is used as a current buffer. That is to say that the energy stored in the magnetic field of the transformer T may be considered constant over a switching cycle, and a constant current $I_m$ flows through the combined primary and secondary windings (not shown). The output load $V_o$ and the filter capacitor $C_o$ may be replaced by an equivalent $V_o$ voltage sink (not shown).

Figure 25:
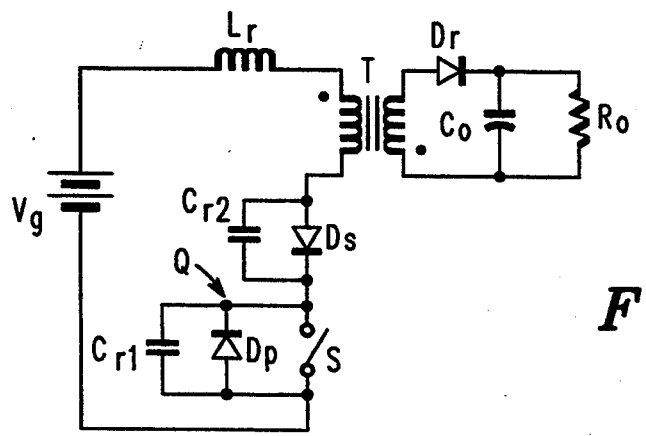
FIG. 25 is a schematic diagram of a novel fly back converter utilizing a ZVS-MR-BIP switch according to the present invention.
Figure 26A:
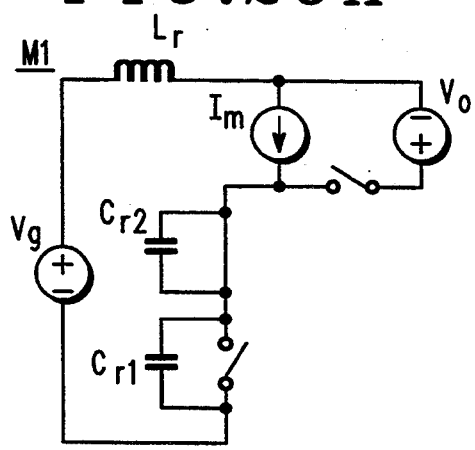
FIG. 26 sets forth the topological circuit modes of FIGS. 26a–26e of the converter of FIG. 25.
Figure 26B:
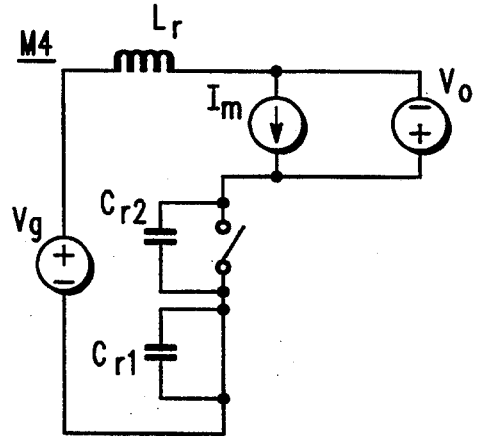
Figure 26C:
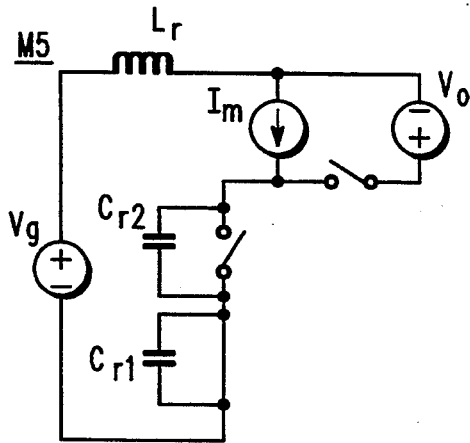
Figure 26D:
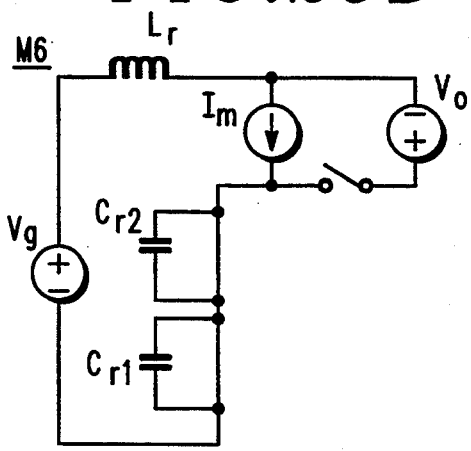
Figure 26E:
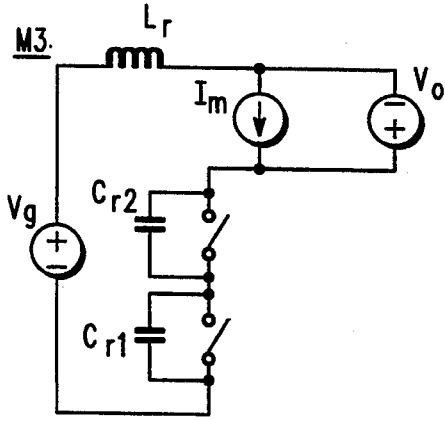
Figure 26F:
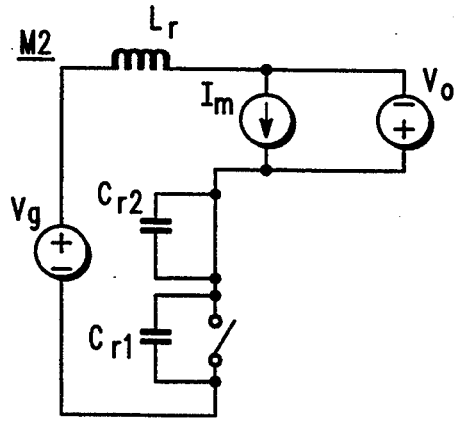
Figure 27:
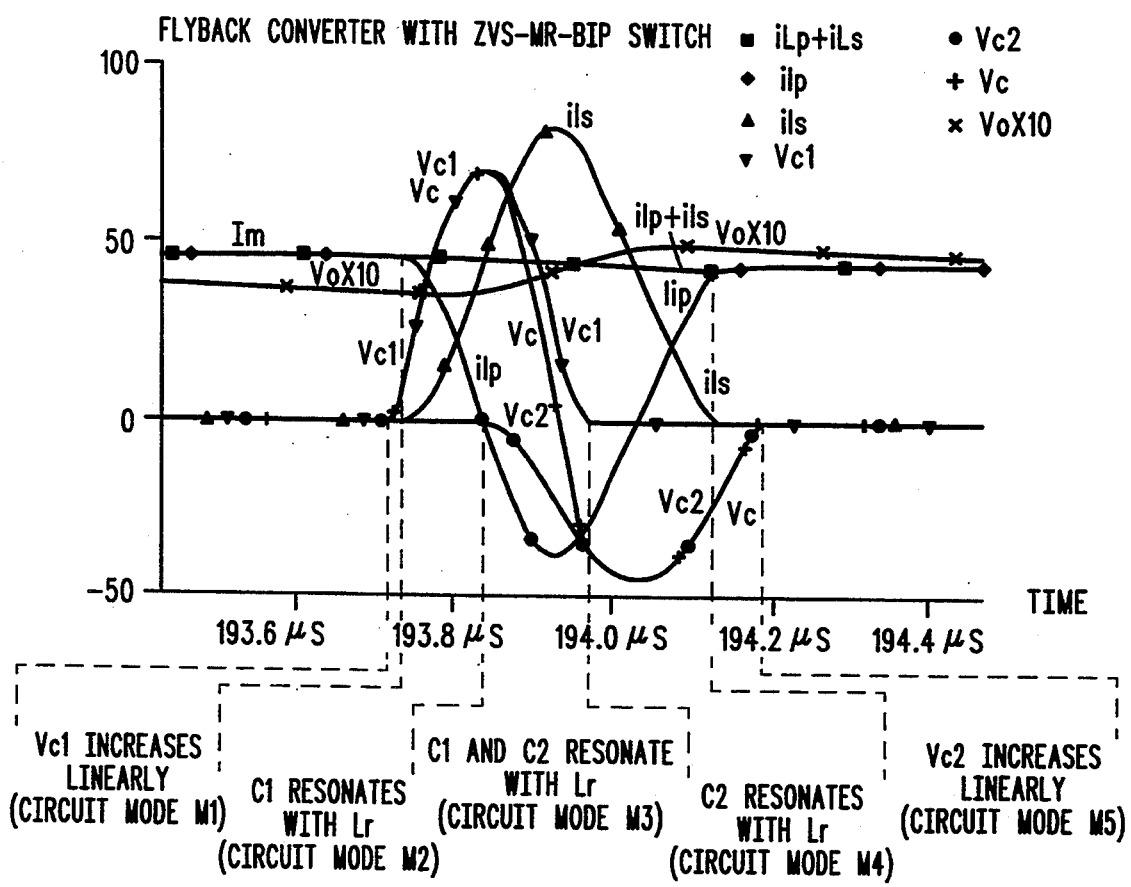
FIG. 27 graphically shows the operational waveforms of the converter of FIG. 25.

The operation of the novel ZVS-MR-BIP fly back converter of FIG. 25 is described as follows: At the beginning of a switching cycle, it is assumed that the rectifying diode Dr is off and the switch S and the series diode $D_s$ are on and are carrying a constant current value of $I_m$. This current is the magnetization current of the primary (not shown) of transformer T. Referring to the topological circuit modes of FIG. 26 along with the operational waveforms of FIG. 27, at time $t_0$, the switch S is turned off and the current bypasses the switch S flowing into the capacitor $C_{r1}$ causing its stored voltage to increase linearly. At time $t_1$, the voltage on the capacitor $C_{r1}$ reaches a value of $V_g+nV_o$, where n is the turns ratio of the transformer T. The rectifying diode $D_r$ then turns on, and the output voltage sink $V_o$ is connected across the secondary of the transformer T. Energy stored as leakage of transformer Y now resonates into the capacitor $C_{r1}$, causing its voltage to reach a peak value. At time $t_2$, the inductor current reverses polarity and the voltage on the capacitor $C_{r1}$ begins to decrease. At the same time, the series diode $D_s$ turns off and the voltage on the capacitor $C_{r2}$ begins to increase negatively.

During this time, all three reactive elements resonate together. At time $t_3$, the voltage on the capacitor $C_{r1}$ has decreased to zero, and the body diode $D_p$ of the MOSFET Q turns on. Negative current flowing through the inductor Lr maintains the body diode Dp on long enough for a control circuit (not shown) to turn the MOSFET Q on with zero-voltage. Although the capacitor $C_{r1}$ is shorted, the capacitor $C_{r2}$ still resonates with the leakage inductance Lr, and continues to do so until the inductor current again flows positively and reaches the magnetization current value of Im. At $t_4$, the rectifying diode $D_r$ turns off causing a constant current Im to flow through the leakage inductance and the capacitor $C_{r2}$. This causes the voltage on the capacitor $C_{r2}$ to decrease linearly in magnitude to zero. At $t_5$, the series diode $D_s$ turns on as the capacitor voltage on the capacitor $C_{r2}$ attempts to go positive. The voltage on both capacitors $C_{r1}$ and $C_{r2}$. remains at zero, and the current through the inductor $L_r$ remains constant and equal to $I_m$ until a new switching cycle is initiated at time $t_0+T_s$ when the switch S is again turned off.

As long as the switch S remains on, a constant di/dt exists across the primary of the transformer Y, and energy from the source $V_g$ flows into the transformer Y causing the magnetization current to increase. Since it is assumed that the magnetization inductance is large, the increase in the current during this time will be small resulting in a small ripple current superimposed on a DC value. The additional energy that is stored in the transformer Y during this time flows to the load during times $t_1$ through $t_4$.

As one of ordinary skill can appreciate, the ZVS-MR-BIP switch provided by the present invention may be implemented in a number of different converter topologies including but not limited to the family of switch-mode converters. In fact the present invention should be considered independently from any particular converter topology. The basic requirements for a suitable topology for the present invention is presence of at least one voltage source and at least one current source which may be connected and disconnected from the switching cell by some external switching means such as a diode.

One should note that although the switch provided by the present invention has been described as a MOSFET, a variety of other semi-conductor devices such as IGBT and bi-polar transistors may be utilized.

Figure 28:
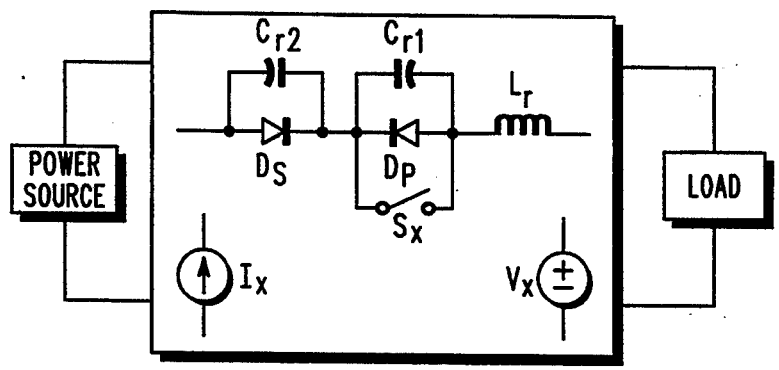
FIG. 28 is a schematic representation of a generalized converter utilizing the ZVS-MR-BIP switch of the instant invention.
Figure 29A:
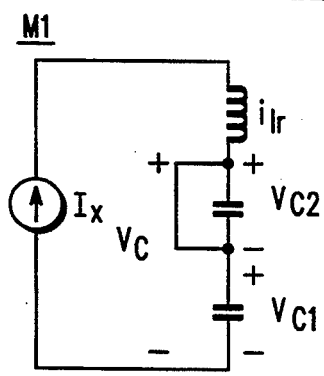
FIG. 29 sets forth schematic diagrams 29a–29e which show the topological circuit modes of the generalized converter of FIG. 29.
Figure 29B:
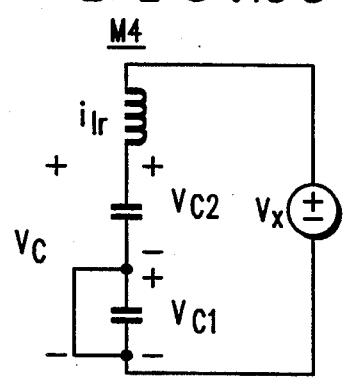
Figure 29C:
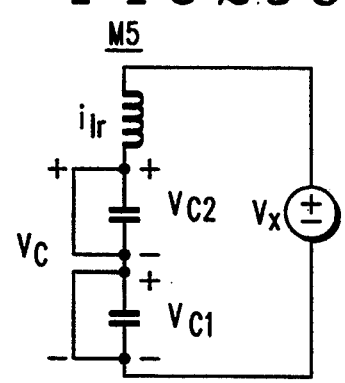
Figure 29D:
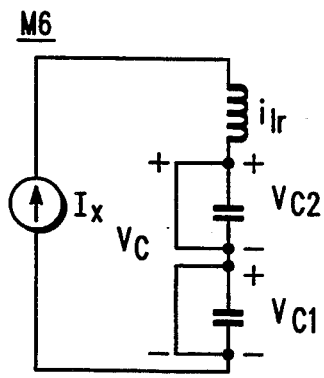
Figure 29E:
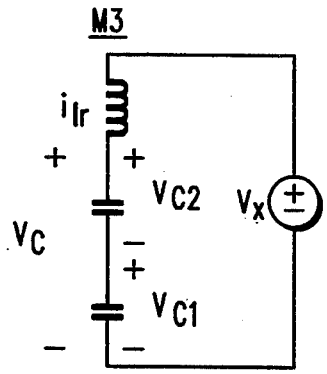
Figure 29F:
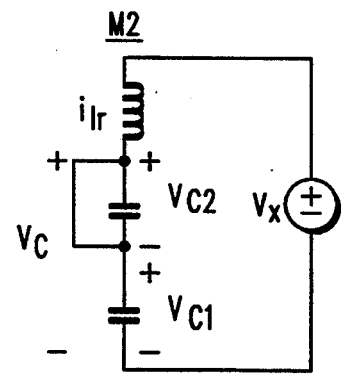

Referring now to FIG. 28, the ZVS-MR-BIP switch of the instant invention is implemented with a current source $I_x$, a voltage source $V_x$, and a switch or switches $S_x$ for connecting and disconnecting the sources to the ZVS-MR-BIP switching cell. In a typical converter circuit one of these sources would serve as a load (with a lowpass inductive or capacitive filter) to which a net amount of energy is delivered, and the other would serve as the power source from which a net amount of energy would flow. At the beginning of the switching cycle, it is assumed that the current source is connected in series with the switch cell, and the switch S is on. As a result, a current of value $I_x$ flows through the inductor. It is also assumed that the series diode $D_s$ is on and is carrying the same current.

Referring then to the topological circuit modes of FIG. 29 along with the corresponding waveforms as set forth in FIG. 30, at time $t_0$, the switch S is turned off and the current bypasses the switch flowing into the capacitor $C_{r1}$ causing its voltage to increase linearly. At time $t_1$, the voltage on the capacitor $C_{r1}$ reaches a value equal to that of $V_x$, the external voltage source. By control means (not shown), the current source $I_x$ is disconnected from the switch cell, and the voltage source $V_x$ is connected in parallel with the switching cell. Energy stored in the inductor $L_r$ now resonates into the capacitor $C_{r1}$, causing its voltage to reach a peak value. At time $t_2$, the inductor current reverses polarity and the voltage on the capacitor $C_{r1}$ begins to decrease. At the same time, the series diode $D_s$ turns off and the voltage on the capacitor $C_{r2}$ begins to increase negatively. During this time, all three reactive elements resonate together. At time $t_3$, the voltage on the capacitor $C_{r1}$ has decreased to zero, and the body diode $D_p$ of the MOSFET Q turns on.

Negative current flowing through the inductor $L_r$ maintains the body diode $D_p$ on long enough for a control circuit (not shown) to turn the MOSFET Q on with zero-voltage. Although the capacitor $C_{r1}$ is shorted, the capacitor $C_{r2}$ still resonates with inductor Lr, and continues to do so until the inductor current again flows positively and reaches a value of $I_x$. At $t_4$, the external voltage source $V_x$ is disconnected, and the external current source $I_x$ is again connected in series with the switching cell by some external switching means (not shown). A constant current value of $I_x$ flows through the inductor $L_r$ and the capacitor $C_{r2}$, causing the voltage on the capacitor $C_{r2}$ to decrease linearly in magnitude to zero. At $t_5$, the series diode $D_s$ turns on as the capacitor voltage on the capacitor $C_{r2}$ attempts to become positive. The voltage on both capacitors $C_{r1}$ and $C_{r2}$ remains at zero, and the current through the inductor $L_r$ remains constant and equal to $I_x$ until a new switching cycle is initiated at time $t_0+T_s$ when the switch $S_x$ is again turned off.

Typical steady state operation of a preferred embodiment of the present invention will now be described.

STEADY-STATE ANALYSIS OF A ZVS-MR-BIP BOOST CONVERTER ACCORDING TO THE PRESENT

As mentioned previously in the converter operation description, the input voltage source $V_g$ and input inductor $L_i$ may be equivalently replaced with a current source of value $I_g$ provided the inductor is sufficiently large to insure an approximately constant current flow through it. Similarly, the output load and capacitor filter $C_o$ may be replaced by an equivalent voltage sink of value $V_o$ provided the RC time constant of the lowpass filter is significantly larger than the switching period of the converter. The Boost converter of FIG. 14 may be represented in a simplified fashion as shown in FIG. 31. The converter topological circuit modes are shown in FIG. 17.

Definitions and normalizations

Several circuit parameters are useful in analyzing the converter operation:

We first define the capacitance $C_r$ as:

$$C_r = \frac{C_{r1} C_{r2}}{C_{r1} + C_{r2}}$$

We also define the voltage across this capacitor as $v_c$:

$$v_c = v_{Cr1} + v_{Cr2}$$

It will be useful in the following analysis to define characteristic impedance and natural angular frequencies of the L-C network:

$$Z_{o1} = \sqrt{L_r/C_{r1}}\ ;\ Z_{o2} = \sqrt{L_r/C_{r2}}\ ;\ Z_o = \sqrt{L_r/C_r}$$

$$\omega_{o2} = \frac{1}{\sqrt{L_r C_{r2}}}\ ;\ \omega_{o1} = \frac{1}{\sqrt{L_r C_{r1}}}\ ;\ \omega_o = \frac{1}{\sqrt{L_r C_r}}$$

Because two resonant capacitors exist in the circuit, it is convenient to define an expression which will relate them. We define the capacitor ratio constant k as:

$$k \approx \frac{\omega_o}{\omega_{o1}} = \sqrt{C_{r1}/C_{r2} + 1}$$

In order to generate analytical results independent of a particular set of component values, we normalize all currents, times, impedance, and frequencies. Three normalizations will be used, and the various normalized quantities may be distinguished by the three subscripts n, n', and n''. In general, normalized current will be defined as:

$$i_{n'} \approx i\frac{Z_{o1}}{V_g} \; ; \; i_{n''} \approx i\frac{Z_{o2}}{V_g} \; ; \; i_n \approx i\frac{Z_o}{V_g}$$

Normalized times (referred to also as equivalent conduction angles,) are denoted by $\alpha_{if}$, $\beta_{if}$, and $\delta_{if}$, where the subscripts i and f refer to the initial and final times $t_i$ and $t_f$ of the time quantity being normalized. The three normalizations are shown for $\alpha$'s only, but are defined identically for $\beta$'s and $\delta$'s.

$$\alpha_{if} = \omega_{o1}(t_f - t_i)$$

$$\alpha_{if'} = \omega_{o2}(t_f - t_i)$$

$$\alpha_{if} = \omega_o(t_f - t_i)$$

The load impedance has also been normalized using the characteristic impedance defined above:

$$Q_{l'} = R_o/Z_{o1}$$

$$Q_{l'} = R_o/Z_{o2}$$

$$Q_l = R_o/Z_o$$

Finally, the switching frequency of the converter has been normalized using the natural resonant frequencies of the L-C tank circuit:

$$f_{sn'} \approx f_s \frac{2\pi}{\omega_{o1}} \; ; \; f_{sn''} \approx f_s \frac{2\pi}{\omega_{o2}} \; ; \; f_{sn} \approx f_s \frac{2\pi}{\omega_o}$$

Quantities normalized by the three normalizations may be related by the capacitor ratio constant k:

$$i_n = k i_{n'}; \; i_{n'} = i_n/k$$

$$i_n = \frac{1}{\sqrt{1 - 1/k^2}} i_{n''}; \; i_{n''} = \sqrt{1 - 1/k^2} \; i_n$$

$$i_{n''} = \sqrt{k^2 - 1} \; i_{n'}; \; i_{n'} = \frac{1}{\sqrt{k^2 - 1}} i_{n''}$$

$$\alpha_{if} = k\alpha_{if'}; \; \alpha_{if'} = \alpha_{if}/k$$

$$\alpha_{if} = \frac{1}{\sqrt{1 - 1/k^2}} \alpha_{if''} \; ; \; \alpha_{if''} = \sqrt{1 - 1/k^2} \; \alpha_{if}$$

$$\alpha_{if''} = \sqrt{k^2 - 1} \; \alpha_{if'}; \; \alpha_{if'} = \frac{1}{\sqrt{k^2 - 1}} \alpha_{if''}$$

$$Q_{l'} = kQ_l; \; Q_l = Q_{l'}/k$$

$$Q_{l'} = \frac{1}{\sqrt{1 - 1/k^2}} Q_l; \; Q_l = \sqrt{1 - 1/k^2} \; Q_{l'}$$

$$Q_{l'} = \sqrt{k^2 - 1} \; Q_{l'}; \; Q_{l'} = \frac{1}{\sqrt{k^2 - 1}} Q_{l'}$$

$$f_{sn'} = kf_{sn}; \; f_{sn} = f_{sn'}/k$$

$$f_{sn''} = \frac{1}{\sqrt{1 - 1/k^2}} f_{sn}; \; f_{sn} = \sqrt{1 - 1/k^2} \; f_{sn''}$$

$$f_{sn'} = \sqrt{k^2 - 1} \; f_{sn''}; \; f_{sn''} = \frac{1}{\sqrt{k^2 - 1}} f_{sn'}$$

Power Conservation Principles

Central to the steady-state analysis is the conservation of power. It is expressed as follows:

$$V_g I_g = V_o I_o$$

Since $I_o = V_o/R_o$, $$V_g I_g = \frac{V_o^2}{R_o}$$

The converter voltage gain m is defined as $$m \approx \frac{V_o}{V_g}$$

therefor power conservation expressed in normalized quantities as:

$$I_{gn} = mI_{on}; \; I_{gn'} = mI_{on'}; \; I_{gn''} = mI_{on''}$$

since $$I_{on} = \frac{m}{Q_l} \; ; \; I_{on'} = \frac{m}{Q_{l'}} \; ; \; I_{on''} = \frac{m}{Q_{l''}}$$

therefor $$I_{gn} = \frac{m^2}{Q_l} \; ; \; I_{gn'} = \frac{m^2}{Q_{l'}} \; ; \; I_{gn''} = \frac{m^2}{Q_{l''}}$$

Calculations of Steady-State Currents, Voltages, and Times

Referring to the converter of FIG. 14 in light of the state-plane diagram of FIG. 32 and the converter circuit modes of FIG. 17, and using the above definitions and expressions, all necessary quantities may be generated for calculating the converter voltage gain as a function of normalized lead, normalized switching frequency, and capacitor ratio constant k.

At the beginning of the switching cycle, the active switch S is turned off, and the input current $I_g$ flows into the resonant capacitor $C_{r1}$. The converter is in topological circuit mode M1. The converter remains in this mode until the normalized capacitor voltage reaches a value of m. The amount of time spent in this circuit mode may be calculated by solving the differential equation $$\frac{dv_{c1}}{dt} = \frac{1}{C_{r1}} I_g$$

as,

-continued $$\beta_{01} = \omega_o(t_1 - t_0) = \frac{m}{I_{gn}}$$

At time t1, the converter goes into circuit mode M2, and capacitor $C_{r1}$ and inductor $L_r$ resonate together a quarter cycle until time t2 when the inductor current reaches the value of $I_g$. The normalized inductor current equals:

$$i_{ln}(t) = I_{gn'} + I_{gn'}\sin\{\omega_{o1}(t-t_1) - \pi/2\}$$

The normalized amount of time spent in mode M2 is:

$$\alpha_{12} = k\alpha_{12'} = k\frac{\pi}{2}$$

From time t2 to t3, the converter is in circuit mode M3, and all three resonant elements resonant together. The normalized inductor current in this mode equals:

$$i_{ln}(t) = I_{gn} + r_{23n}\sin\{\omega_o(t-t_2)\}$$

and the differential equation describing the capacitor voltage on $C_{r1}$ equals:

$$\frac{dv_{c1}}{dt} = \frac{1}{C_{r1}}(I_g - i_l)$$

In normalized quantities this is expressed as:

$$\frac{dv_{c1n}}{dt} = \frac{1}{C_{r1}Z_o}(I_{gn} - i_{ln})$$

This equation may be simplified and solved to yield an expression for $\alpha_{23}$. To do this, we recognize that at $t_2$, the normalized voltage on $C_{r1}$ is $m+I_{gn'}$, and at $t_3$, tho voltage is zero. Therefor, $$v_{c1n}(t_3) - v_{c1n}(t_2) = \frac{\omega_o}{k^2}\int_{t_2}^{t_3}[I_{gn} - i_{ln}(t)]dt$$

$$0 - (I_{gn'} + m) = \frac{\omega_o}{k^2}\int_{t_2}^{t_3}[-r_{23n}\sin\{\omega_o(t-t_2)\}]dt$$

$$0 - (I_{gn'} + m) = \frac{r_{23n}}{k^2}[\cos(\alpha_{23}) - 1]$$

where, $$r_{23n} = I_{gn'}$$

Therefor, $$\alpha_{23} = \omega_o(t_3 - t_2) = \cos^{-1}\left\{1 - k^2 - \frac{mk^2}{I_{gn'}}\right\}$$

The normalized resonant inductor current $I_{ln}$ and resonant capacitor voltage $v_{cn}$ at time $t_3$ may be calculated using the above expression for $\alpha_{23}$ along with the state-plane diagram:

$$i_{ln}(t_3) = I_{gn} + r_{23n}\sin\{\alpha_{23}\}$$

$$v_{cn}(t_3) = m + r_{23n}\cos\{\alpha_{23}\}$$

Looking at the state-plane diagram of FIG. 32, it is noted that circuit mode M4 during time t3 to t4 is represented by an arc beginning at an angle $\theta_{3''}$ and possessing a radius $r_{34n''}$. The arc spans an angle $\alpha_{34''}$. These quantities may all be determined based upon the above calculations along with the state-plane diagram:

$$\theta_{3''} = \frac{\pi}{2} + \tan^{-1}\left\{\frac{m - v_{cn}(t_3)}{i_{ln''}(t_3) - I_{gn''}}\right\}$$

$$r_{34n''} = \sqrt{[m - v_{cn}(t_3)]^2 + [i_{ln''}(t_3) - I_{gn''}]^2}$$

$$\alpha_{34} = \frac{1}{\sqrt{1 - 1/k^2}}\alpha_{34''} =$$

$$\frac{1}{\sqrt{1 - 1/k^2}}\left[\pi - \theta_{3''} + \tan^{-1}\left\{\frac{I_{gn} - 0}{m - v_{cn}(t_4)}\right\}\right]$$

The normalized time $a_{34}$ is calculated by noting that the resonant inductor current at time $t_4$, $i_{ln}(t4)$ is zero. This corresponds to when the rectifier diode becomes reversed biased and turns off. The voltage remaining across resonant capacitor $C_{r2}$ is calculated as:

$$v_{cn}(t_4) = m - \sqrt{r_{34n''}^2 - I_{gn''}^2}$$

During the time $t_4$ to $t_5$ the converter is in circuit mode M5 and the capacitor voltage is described by the differential equation, $$\frac{dv_{c2}}{dt} = \frac{1}{C_{r2}}I_g$$

The amount of time spent in this circuit mode may be determined by solving the above equation:

$$\beta_{45} = \omega_o(t_5 - t_4) = -\frac{v_{cn}(t_4)}{I_{gn}}$$

At the time $t_5$, the voltage on resonant capacitor $C_{r2}$ reaches zero, and the series diode turns on, carrying the input current $I_g$. This corresponds to circuit mode M6, and the converter remains in this mode until a new switching cycle is initiated by turning the transistor off once again. The amount of time spent in this mode is determined by summing up the amount of time spent in all other circuit modes and subtracting this quantity from the switching period. The resulting difference determines the time spent in circuit mode M6 and must obviously be equal to a non-negative value. Therefor:

$$\delta_{50} = \omega_o(t_5 - (t_o - T_s)) = \omega_o Y_s - \omega_o(t_5 - t_0)$$

$$\delta_{50} = \frac{2\pi}{f_{sn}} - (\beta_{01} + \alpha_{12} + \alpha_{23} + \alpha_{34} + \beta_{45})$$

where the constraint $\delta_{50} \geq 0$ must be satisfied.

Average Output Current $I_o$ Calculations

The average output current $I_o$ may be calculated by averaging the resonant inductor current during each time interval of a switching period. Therefor, $$I_o = \frac{1}{T_s} \int_{t_0}^{t_0 + T_s} i_l(t)dt$$

Normalizing the above expression and expanding it, $$I_{on} = \frac{1}{T_s} \int_{t_0}^{t_0 + T_s} i_{ln}(t)dt$$

$$I_{on} =$$

$$\frac{1}{T_s}\int_{t_0}^{t_1} i_{ln}(t)dt + \frac{1}{T_s}\int_{t_1}^{t_2} i_{ln}(t)dt + \frac{1}{T_s}\int_{t_2}^{t_3} i_{ln}(t)dt +$$

$$\frac{1}{T_s}\int_{t_3}^{t_4} i_{ln}(t)dt + \frac{1}{T_s}\int_{t_4}^{t_5} i_{ln}(t)dt + \frac{1}{T_s}\int_{t_5}^{t_0 + T_s} i_{ln}(t)dt$$

To simplify notation, the normalized output current may be rewritten in terms of six components corresponding to the six time intervals over a switching period:

$$I_{on} = I_{n01} + I_{n12} + I_{n23} + I_{n34} + I_{n45} + I_{n50}$$

The six components may be calculated by solving the six integral equations as:

$$I_{n01} = 0$$

$$I_{n12} = \frac{f_{sn}}{2\pi} k I_{gn} \left[ \frac{\pi}{2} - 1 \right]$$

$$I_{n23} = \frac{f_{sn}}{2\pi} I_{gn} \left[ \alpha_{23} - \frac{1}{k} (\cos\{\alpha_{23}\} - 1) \right]$$

$$I_{n34} = \frac{f_{sn}}{2\pi} \frac{1}{[1 - 1/k^2]} [I_{gn''}\alpha_{34''} -$$

$$r_{34n''}\cos\{\alpha_{34''} + \theta_{3''}\} + r_{34n''}\cos\{\theta_{3''}\}]$$

$$I_{n45} = 0$$
$$I_{n50} = 0$$

All quantities in these expressions have been defined previously, and $I_{on}$ may be calculated as a function of the following terms:

$$I_{no} = \text{funct}(k, m, I_{gn}, f_{sn})$$

As defined previously, these four terms correspond to the capacitor ratio constant, the converter voltage gain, the normalized input current, and the normalized switching frequency, respectively.

Converter Voltage Gain m Calculations

By using the principle of power conservation, the above expression for $I_{no}$ may be rearranged to calculate the converter voltage gain. Recall that $$I_{on} = \frac{m}{Q_l}$$

and, $$I_{gn} = \frac{m^2}{Q_l}$$

Therefor, the above expression for $I_{on}$ may be expressed as, $$\frac{m}{Q_l} = \text{funct}(k, m, Q_l, f_{ns})$$

This expression is in terms of four variables: k, m, $Q_l$, and $f_{sn}$. (It may be set forth in terms of the same variables using a different normalization) Given any three of these quantities, the fourth quantity may be determined by the above expression. The converter voltage gain curves are generated by specifying k and $Q_f$ parameters and calculating the voltage gain m as a function of the normalized switching frequency $f_{sn}$. As mentioned previously, the results from these calculations are valid and imply zero-voltage-switching for the transistor only if the calculated quantity $\delta_{50}$ is a non-negative value. FIGS. 19 and 20 show the converter voltage gain versus normalized switching frequency for two ratios of $C_{r1}/C_{r2}$:0.5 and 0.25, respectively.

During the off time (beginning at time $t_o$,) the voltage on the switch resonates to a peak, and then returns to zero where it will remain for a period of time. The minimum off-time and maximum off-time of the switch may be calculated using the state-plane diagram as $$T_{offmin} = \frac{1}{\omega_o} [\beta_{01} + \alpha_{12} + \alpha_{23}]$$

$$T_{offmin} = \frac{1}{\omega_o} \left[ \beta_{01} + \alpha_{12} + \alpha_{23} + \tan^{-1}\left\{ \frac{i_{ln}(t_3) - I_{gn}}{m - v_{cn}(t_3)} \right\} \right]$$

Figure 33:
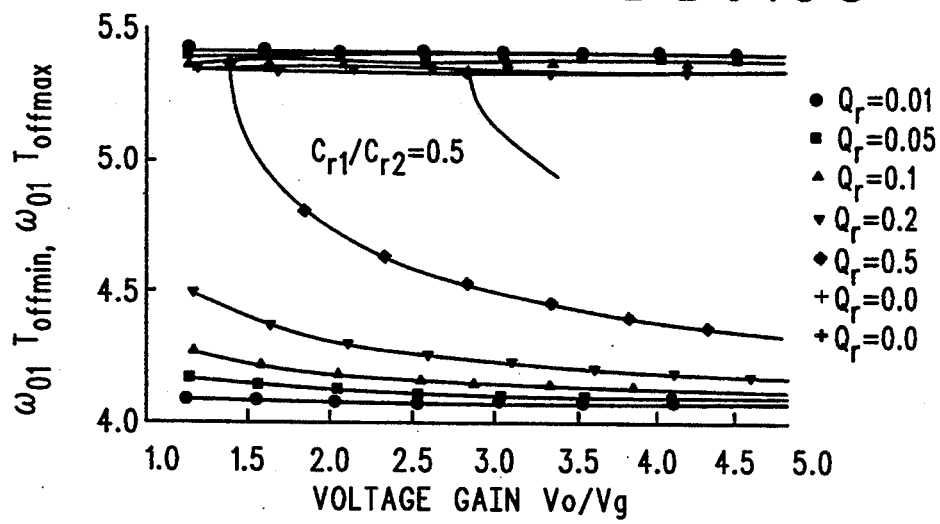
FIGS. 33 & 34 graphically show minimum and maximum transistor off times for achieving ZVS in the converter of FIGS. 13 and 14 using two exemplary capacitor ratio values.
Figure 34:
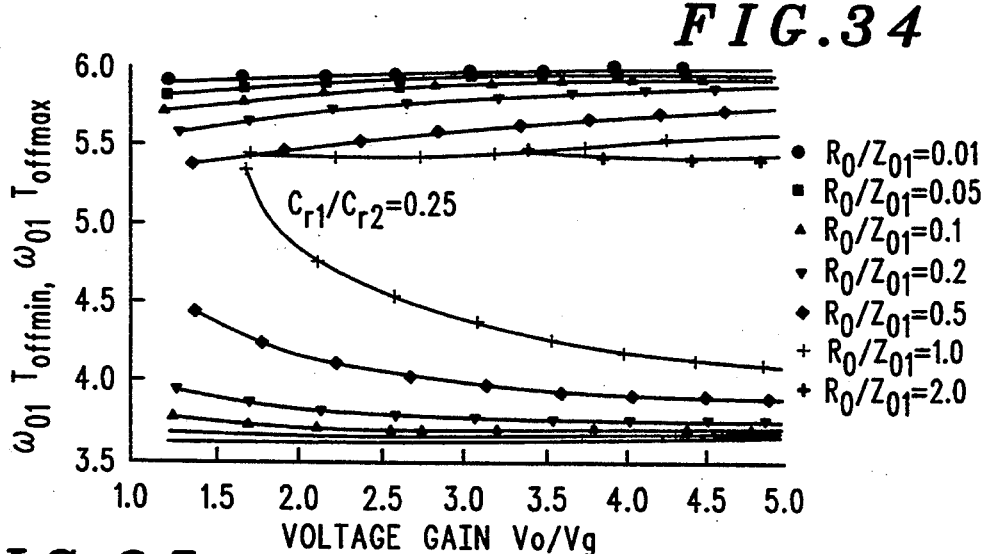
Figure 35:
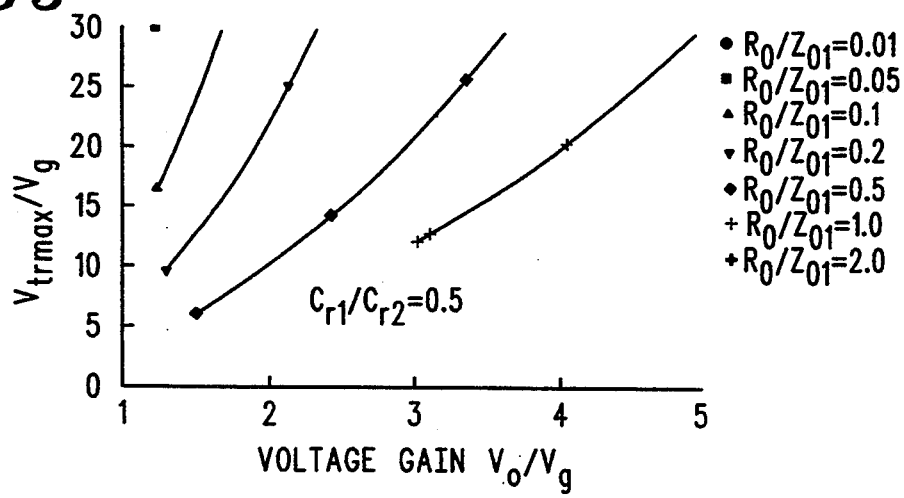
FIGS. 35–40 graphically show peak values for transistor voltage, series diode voltage, and resonant inductor current plotted versus voltage gain of the converters shown in FIGS. 13 and 14 according to the present invention for two exemplary capacitor ratio values.
Figure 36:
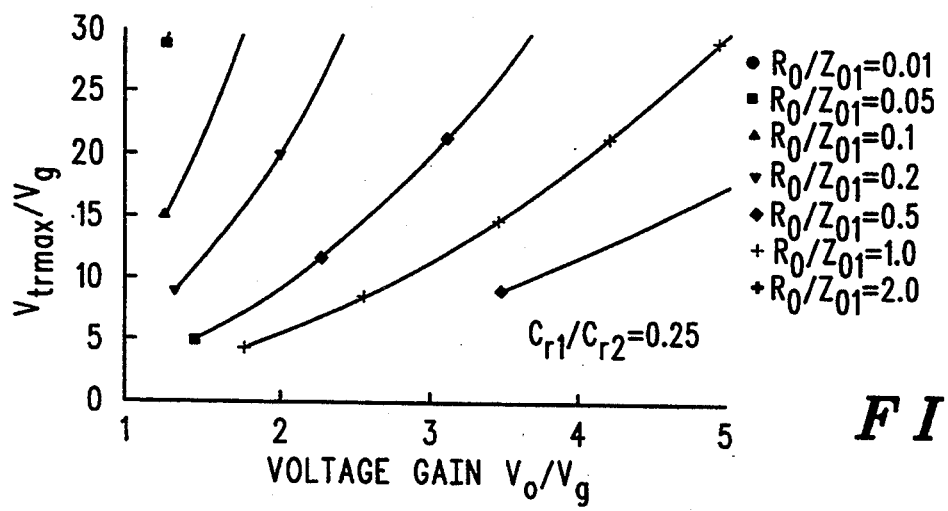
Figure 37:
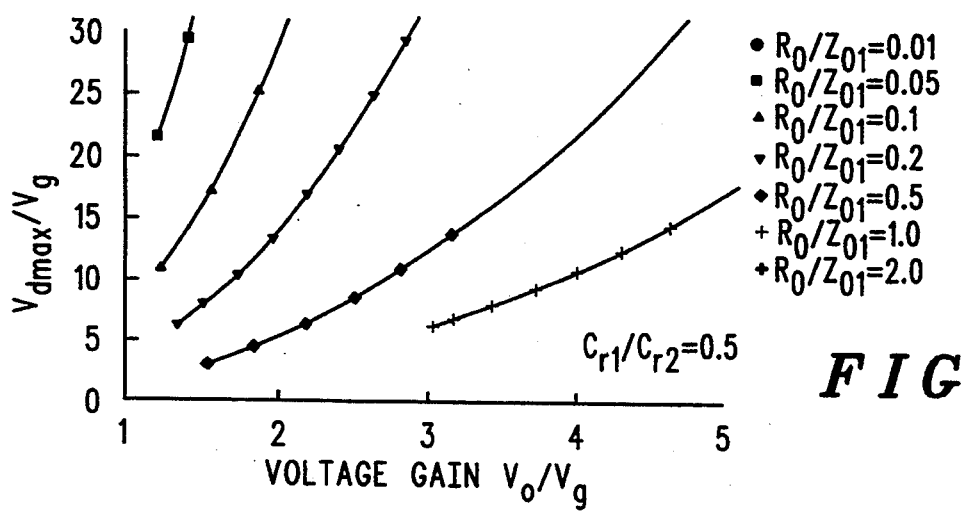
Figure 38:
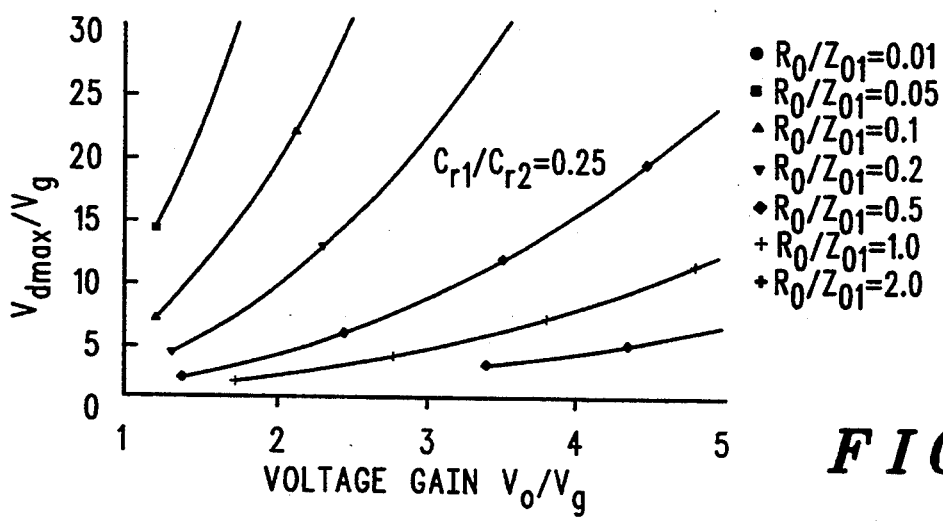
Figure 39:
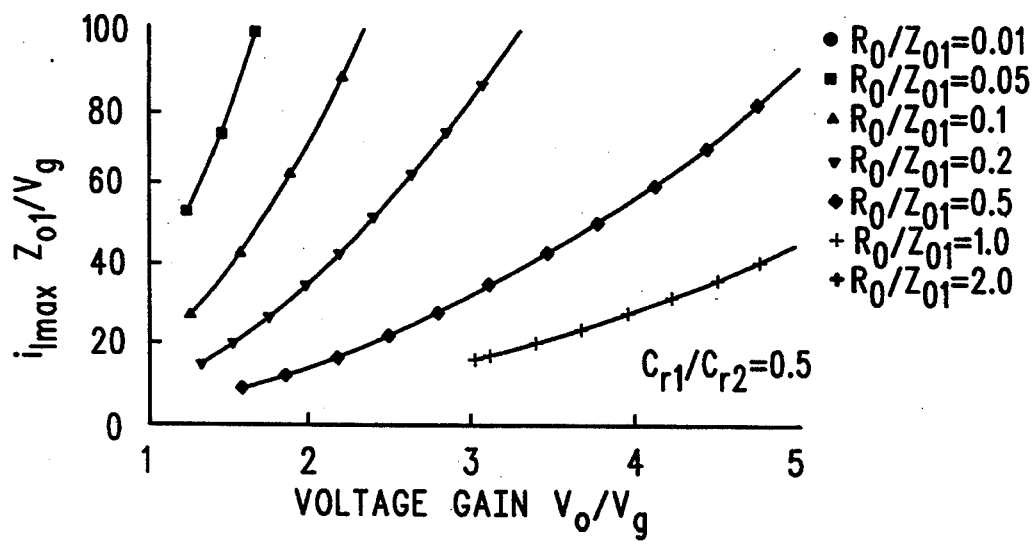
Figure 40:
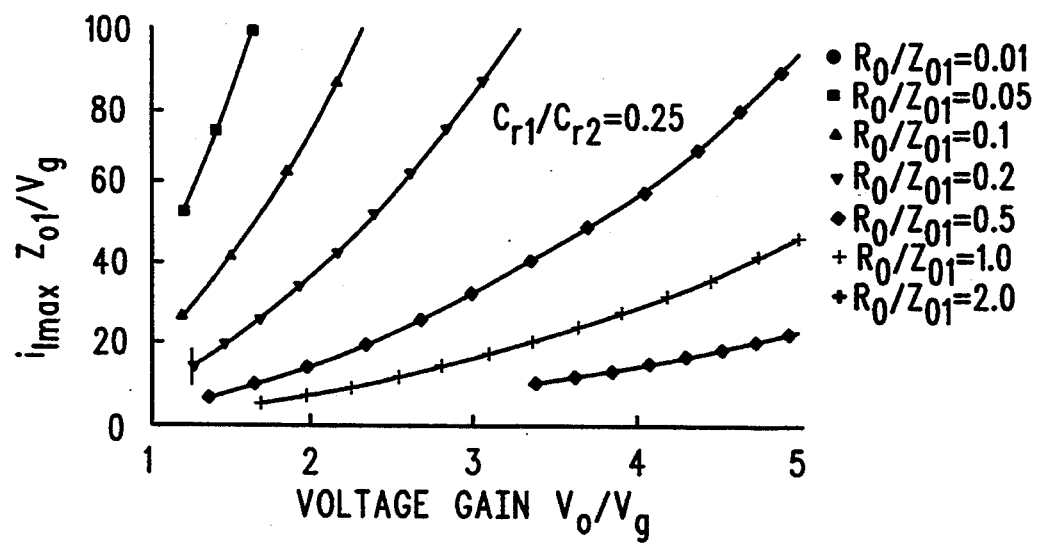

The time at which the switch voltage will depart from zero again (should the switch not be turned on,) corresponds to resonant inductor current decreases to a value of $I_{gn}$ causing the body diode $D_p$ to turn off. The quantities $\omega_o T_{offmin}$ and $\omega_o T_{offmax}$ are plotted versus voltage gain m with normalized load as a parameter. FIGS. 33 and 34 show these plots for Cr1/Cr2=0.5, and Cr1/Cr2=0.25, respectively.

Component Stresses

From the state-plane diagram of FIG. 32, peak voltage and current component stresses may be determined. They are shown to be:

$$v_{c1max} V_g I_{gn'}$$

$$v_{trmax} = V_g I_{gn'}$$

$$v_{c2max} = V_g(r_{34n''} - m)$$

$$v_{dmax} = V_g(r_{34n''} - m)$$

$$i_{lmax} = V_g(I_{gn} + I_{gn'})/Z_o$$

where all expressions have been calculated previously. Plots of these stresses versus converter voltage gain m are shown in FIGS. 35–40.

Design Example

An exemplary 50 Watt, 14 Volt input and 28 Volt output Boost converter according to the present invention may be set forth based upon the converter characteristic curves generated previously. Sample specifications are given as follows:
Input Voltage: 14 Volts
Output Voltage: 28 Volts
Output Power: 50–20 Watts Sw. Frequency: 500 kHz (minimum)

The resonant capacitor ratio $C_{r1}/C_{r2}$ must first be selected. This selection is arbitrary and is based upon a trade-off between good load regulation versus series diode voltage stress and minimum to maximum transistor off-time margin. An exemplary ratio of 0.5 is chosen since good load regulation is achieved while still maintaining a reasonably wide tolerance on the required transistor off-time.

The maximum tolerable switch voltage must next be calculated. Using a 500 Volt device, we determine that $v_{trmax}/V_g < 28$. From FIG. 35, we determine that with a voltage gain of 2.0, the normalized load $Q_r$ must be greater than 0.1. For added margin, we choose $Q_{rmin} = 0.2$. The characteristic impedance $Z_{o1}$ may then be calculated as $R_{omin}/Q_{rmin} = 78.4$.

Based upon the voltage gain curve of FIG. 19, the normalized switching frequency $f_{sn'}$ is determined to be approximately 0.605 given $Q_r = 0.2$, and $m = 2.0$. The natural angular frequency $\omega_{o1}$ may then be calculated as $2\pi f_s/f_{sn'} = 2\pi 500 \text{ kHz}/0.605 = 5.19 \times 10^6 \text{ Rad/S}$. $C_{r1}$ and $L_r$ may now be determined:

$$C_{r1} = \frac{1}{\omega_{o1} Z_{o1}} = 2.46 nF$$

$$L_r = \frac{Z_{o1}}{\omega_{o1}} = 15.1 \mu H$$

The value of resonant capacitor $C_{r2}$ is simply $2.46nF/0.5 = 4.92nF$. From FIGS. 35, 37, and 39 respectively, the following maximum stresses on the transistor, series diode, and inductor may be determined:

$$v_{trmax} = 22 \times 14V = 308V$$
$$v_{dmax} = 13.5 \times 14V = 189V$$

$$i_{lmax} = 36 \frac{14V}{78.4\Omega} = 6.4A$$

At 20 Watts, it may be verified that the switching frequency increases from 500 kHz to 545 kHz.

Figure 41:
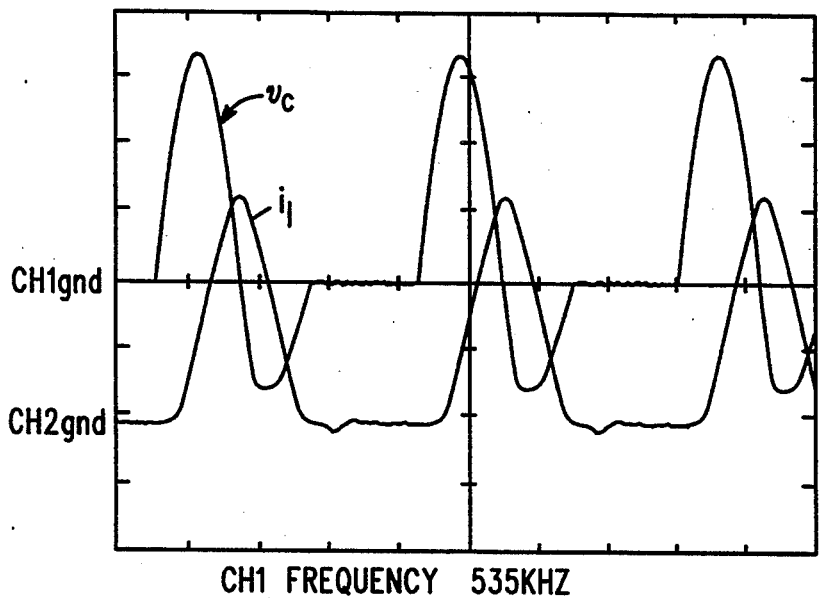
FIG. 41 graphically shows the inductor current and resonant capacitor voltage of the Boost converter provided by the present invention.
Figure 42:
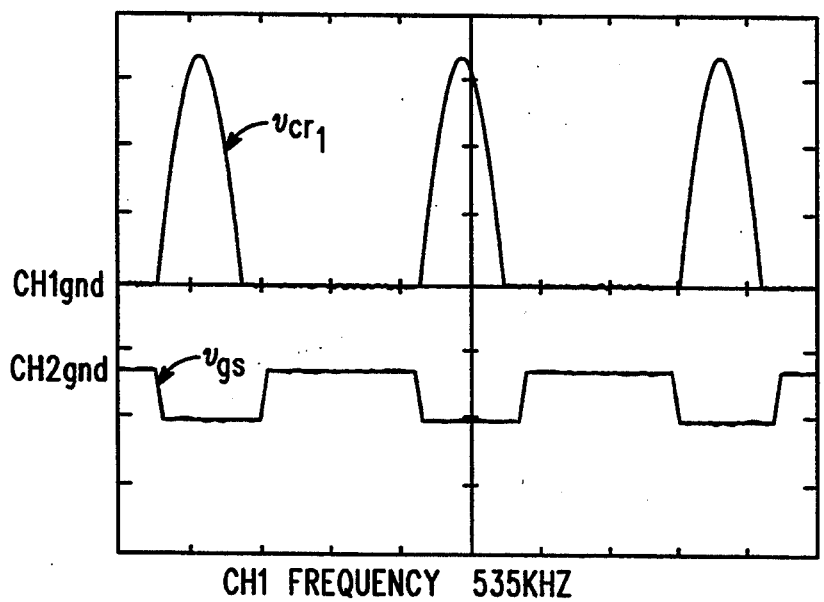
FIG. 42 graphically shows the switch voltage and the switch driving waveform of the Boost converter provided by the present invention.

FIG. 41 shows the resonant inductor current $i_l$ and resonant capacitor voltage $v_c$ of the exemplary Boost converter provided by the present invention. FIG. 42 shows the switch voltage $v_{Cr1}$ and the switch driving waveform $v_{gs}$, and demonstrates the achievement of zero-voltage-switching of the switch while still enabling a full-wave mode operation as is apparent from the voltage waveform $v_c$ of FIG. 41.

A number of novel converter embodiments using a zero-voltage-switching, multi-resonant, bi-polar switch cell according to the present invention have now been described. However, it is to be understood that the principles of the invention may be applied to a large number of different types of converters, as will now be illustrated.

FIGS. 43-50 illustrate some of the commonly known converters including the ZVS-MR-BIP switch cell according to the teachings of the invention. In each of these figures similar elements are depicted with similar notation. Inductors possessing a subscript i indicate input filter inductors for simulating input current sources; inductors and capacitors possessing a subscript o, o1, or o2 indicate output filter elements for simulating current or voltage sinks, respectively. Diodes $D_s$, $D_p$, and $D_r$ correspond to the series diode of the ZVS-MR-BiP switch cell, the parallel diode of the ZVS-MR-BiP switch cell, and the rectifying diode, respectively.

The resonant inductor $L_r$, and the resonant capacitors $C_{r1}$ and $C_{r2}$ may be located in a number of different positions in each converter circuit without affecting operation. Therefor, appended to each resonant inductor and resonant capacitor subscript is an index a, b, or c indicating the various viable positions of that component.

Figure 43A:
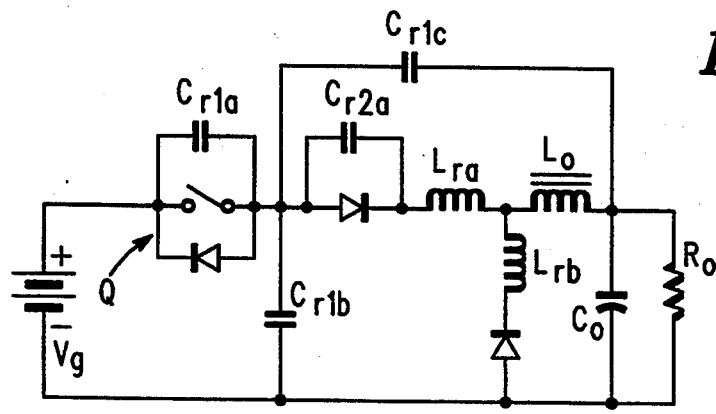
FIGS. 43a–b are schematic diagrams of a Buck converter utilizing the ZVS-MR-BIP switch according to the present invention.
Figure 43B:
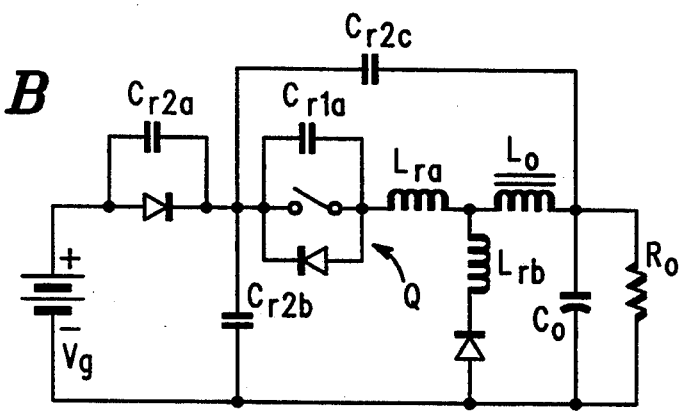
Figure 44A:
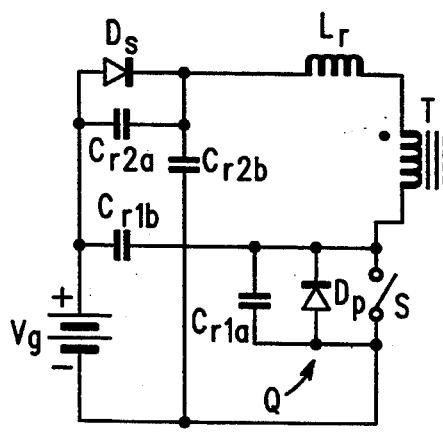
FIGS. 44a–b are schematic diagrams of a Fly back converter utilizing the ZVS-MR-BIP switch according to the present invention.
Figure 44B:
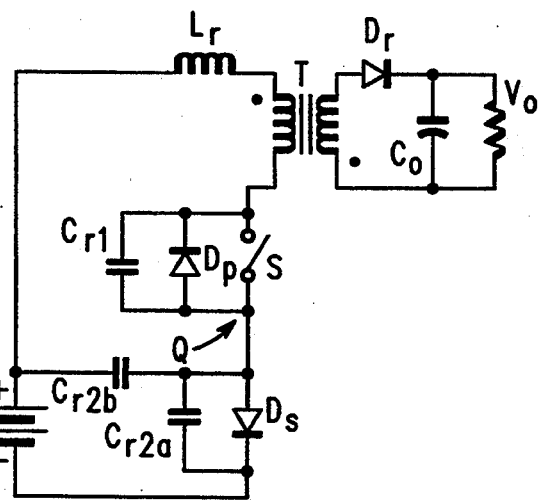
Figure 46C:
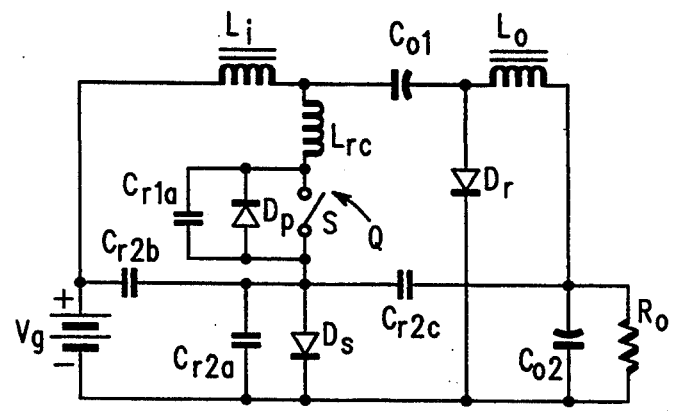
Figure 46D:
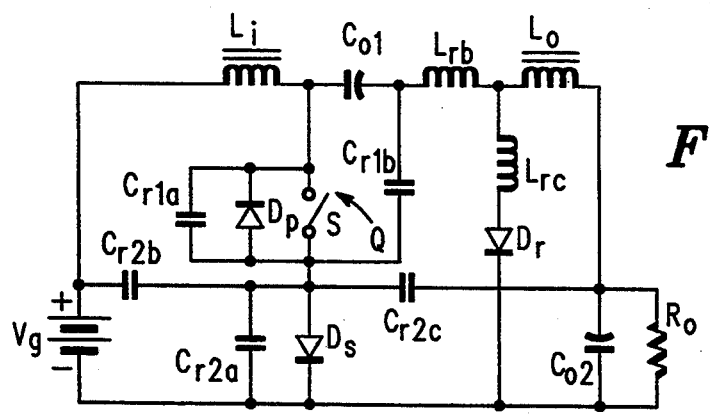
Figure 47A:
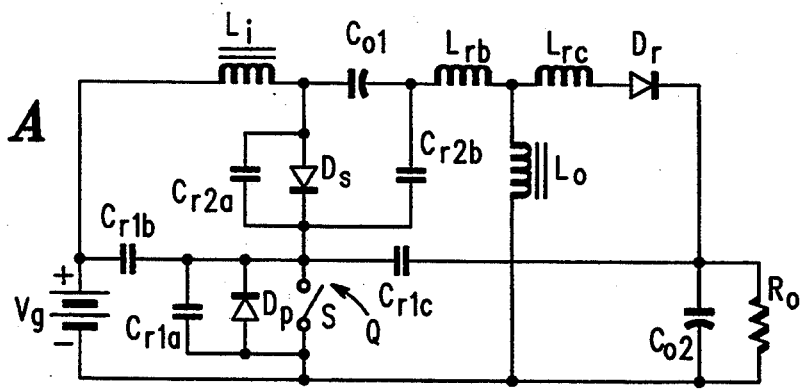
Figure 47B:
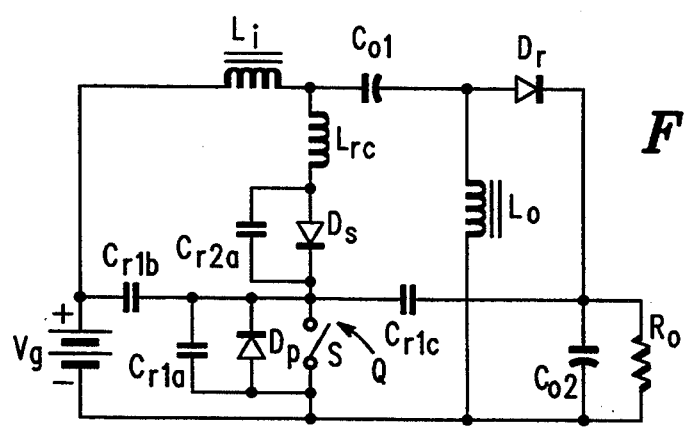
Figure 49A:
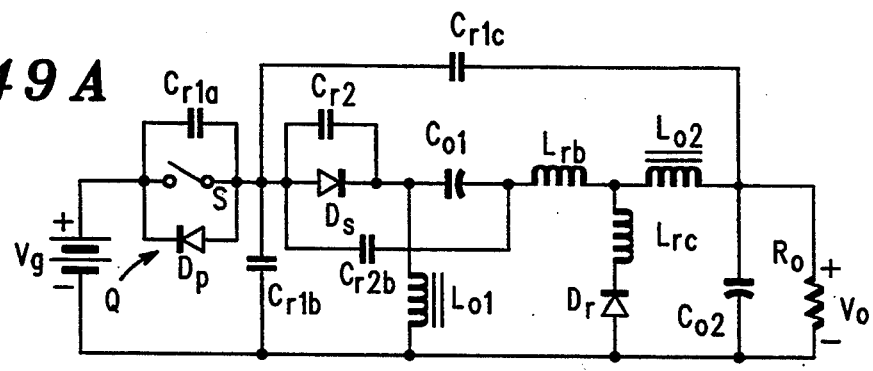
FIGS. 49a–d are schematic diagrams of a Zeta converter utilizing the ZVS-MR-BIP switch according to the present invention.
Figure 49B:
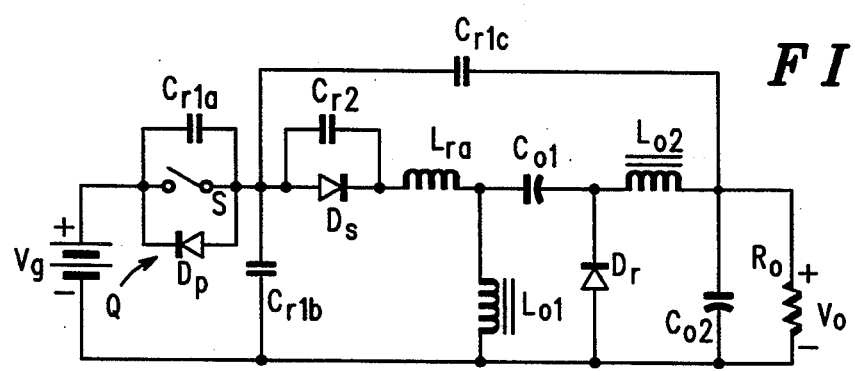
Figure 49C:
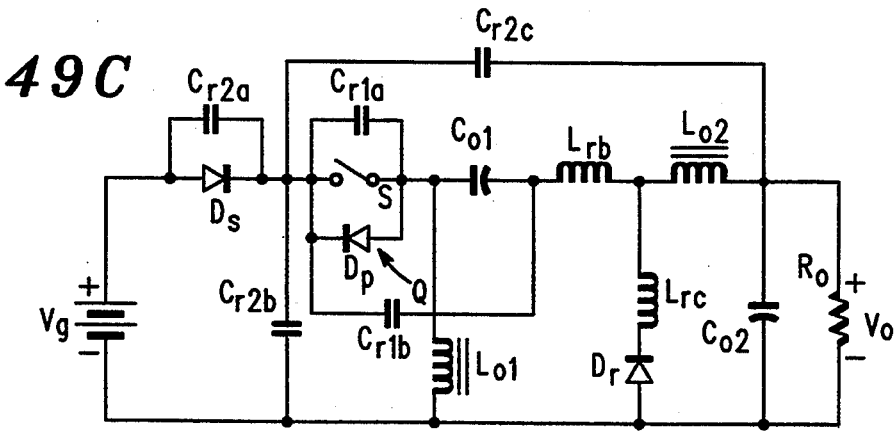
Figure 49D:
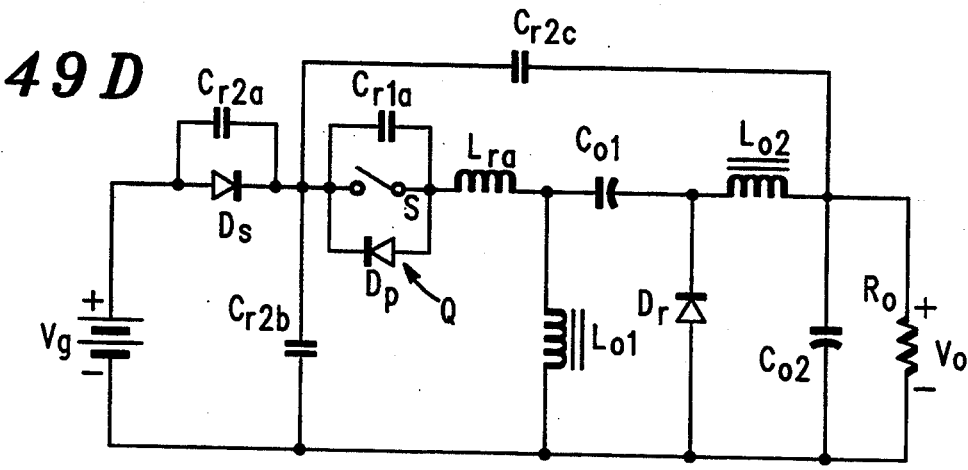
Figure 50A:
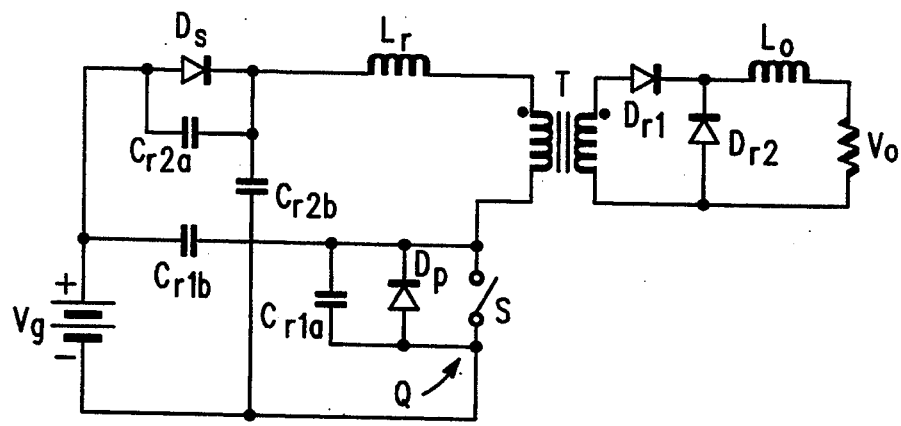
FIGS. 50a–b are schematic diagrams of a Forward converter utilizing the ZVS-MR-BIP switch according to the present invention.
Figure 50B:
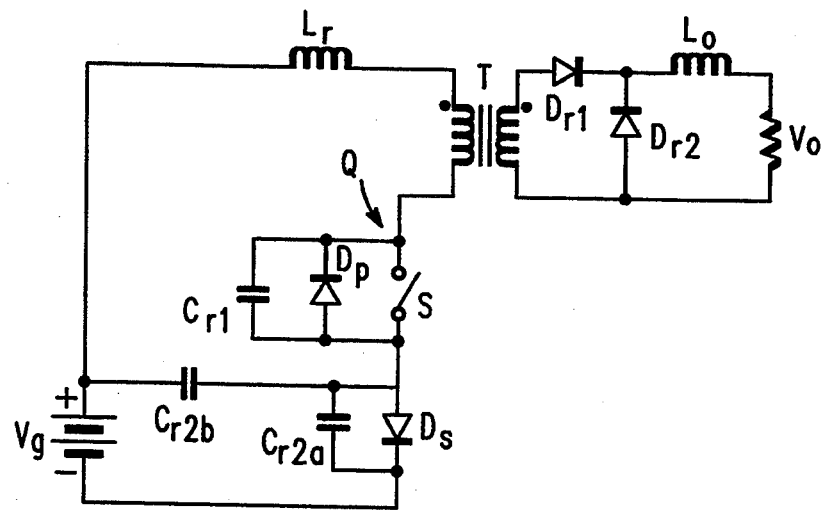

FIGS. 43a and 43b show two configurations of a Buck converter incorporating the ZVS-MR-BIP switch cell of the invention. In FIG. 43a, the resonant inductor $L_r$ may be positioned in two possible positions: in series with the switch S, or in series with the rectifying diode $D_r$. Therefor, an inductor is placed in each of these two locations and denoted as the inductors $L_{ra}$, and $L_{rb}$. Similarly, the resonant capacitor $C_{r1}$ may be positioned in three possible locations, and is therefor denoted as $C_{r1a}$, $C_{r1b}$, and $C_{r1c}$. The resonant capacitor $C_{r2}$ may be placed in only one location, therefor its notation is not changed. FIG. 43a therefor, as one of ordinary skill would appreciate, represents many possible implementations of the Buck converter since, for example, the capacitor $C_{r1}$ may be placed in one of three locations, or distributed between two or three of these locations.

The same may be done with the resonant inductor $L_r$. FIG. 43b shows the same novel Buck converter, with the exception that the series diode and the switch/parallel diode have exchanged positions. This leads to another set of possible configurations for a novel Buck converter.

The various possible positions of the resonant elements in fact is not arbitrary, but is based upon this novel criteria: the inventive motivation for including these resonant elements is to shape the voltage across the switch in such a way as to enable the switch to turn on and turn off with zero volts across it. To accomplish this long felt need, the present invention contemplates that the resonant capacitor $C_{r1}$ is placed in such a way that any voltage change across the switch will also necessitate a corresponding voltage change across the capacitor $C_{r1}$. In other words:

$$\frac{dv_s}{dt} = \frac{dv_{Cr1}}{dt}$$

In FIG. 43a, we see that the capacitor $C_{r1}$ may be implemented by placing the capacitor $C_{r1b}$ as indicated across the series combination of the switch S, and the voltage source $V_g$. This is possible because the above relation is satisfied:

$$\frac{dv_{Cr1a}}{dt} = \frac{dv_s}{dt} + \frac{dV_g}{dt} = \frac{dv_s}{dt} + 0 = \frac{dv_s}{dt}$$

The placement of the capacitor $C_{r2}$ is based upon a similar requirement: A change in voltage across the series diode $D_s$ must correspond to an equal change in voltage across the capacitor $C_{r2}$:

$$\frac{dv_{Ds}}{dt} = \frac{dv_{Cr2}}{dt}$$

The placement of the resonant inductor $L_r$ is also based upon a similar novel principle. As mentioned previously, the resonant capacitor $C_{r1}$ is utilized for shaping the voltage across the switch S. This voltage is determined by the charge which accumulates on the capacitor plates. The purpose of the resonant inductor $L_r$ is to enable and direct the current flow through the resonant capacitor $C_{r1}$ so that the voltage may rise and fall. As a result, the resonant inductor $L_r$ may be placed in any feasible circuit location provided that the rate of change of current through it equals the rate of change of current through the resonant capacitor and associated switch or diode.

In other words, the total current flowing through the capacitor $C_{r1}$, the switch S, and the parallel diode $D_p$ must have a rate of change equal to the rate of change of the resonant inductor current. Similarly, the total current flowing through the capacitor $C_{r2}$ and the series diode $D_s$ must have a rate of change equal to the rate of change of the resonant inductor current:

$$\frac{di_l}{dt} = \frac{di_{Cr1}}{dt} + \frac{di_s}{dt} + \frac{di_{Dp}}{dt} = \frac{di_{Cr2}}{dt} + \frac{di_{Ds}}{dt}$$

In FIG. 43a, it is evident to one of ordinary skill that the resonant inductor $L_r$ may be implemented in the location designated by $L_{ra}$. Based upon the above requirement, we may also show that the novel resonant inductor may be placed in the location designated by $L_{rb}$:

$$\frac{di_{Lrb}}{dt} = \frac{di_{Lra}}{dt} + \frac{dI_{Lo}}{dt} = \frac{di_{Lra}}{dt} + 0 = \frac{di_{Lra}}{dt}$$

The above approximation is valid if filter inductor $L_o$ is very large so that the current $I_o$ flowing through it does not change significantly over a switching period.

FIGS. 44–50 show exemplary implementations of Boost (FIGS. 45A,B), Buck/Boost (FIGS. 48A,B), Boost/Buck (or Cuk) (FIGS.46A–D), Sepic (FIGS.47-A–D), Zeta (FIGS. 49A–D), Fly back (FIGS. 44A,B), and Forward (FIGS. 50A,B) converters, all according to the teachings of the present invention. Moreover, it is purposefully contemplated that the teachings of the present invention as hereinabove described not be limited to the described embodiments, as one of ordinary skill in the art will appreciate and can ascertain from the above disclosure in combination with the following claims.

What is claimed is:

1. A variable frequency, zero-voltage switched, multi-resonant converter for receiving power from a power source and providing power to a load, said converter including rectifying means for directing power from the power source to the load and optionally including at least one of a filtering inductor and a filtering capacitor, said converter comprising:

(a) a resonant switch means (S) for connecting and disconnecting said power source to and from said load;

(b) a first diode ($D_p$) in parallel with said switch means (S);

(c) a second diode ($D_S$) in series with said switch means (S);

(d) a first resonant capacitor ($C_{r1}$);

(e) a second resonant capacitor ($C_{r2}$);

(f) a resonant inductor ($L_r$);

wherein said first resonant capacitor ($C_{r1}$) is operatively connected to said resonant switch means (S) such that any voltage change across said first resonant capacitor ($C_{r1}$) necessitates a corresponding voltage change across said resonant switch means (S) such that $$\frac{dv_S}{dt} = \frac{dv_{Cr1}}{dt}$$

and wherein said second resonant capacitor ($C_{r2}$) is operatively connected to said second diode ($D_s$) such that any voltage change across said second resonant capacitor ($C_{r2}$) necessitates a corresponding voltage change across said second diode ($D_s$) such that $$\frac{dv_{Ds}}{dt} = \frac{dv_{Cr2}}{dt}$$

and wherein said resonant inductor ($L_r$) is operatively connected in series with said resonant switch means (S) such that any current change through said resonant inductor ($L_r$) necessitates a corresponding change in a sum of currents flowing through said first resonant capacitor ($C_{r1}$), said first diode ($D_p$), and said resonant switch means (S);

and wherein any current change through said resonant inductor ($L_r$) necessitates a corresponding change in a sum of currents flowing through said second resonant capacitor ($C_{r2}$) and said second diode ($D_s$), such that $$\frac{di_{Lr}}{dt} = \frac{d}{dt}(i_{Cr1} + i_s + i_{Dp})$$

and $$\frac{di_{Lr}}{dt} = \frac{d}{dt}(i_{Cr2} + i_{Ds});$$

and wherein the sum of instantaneous currents flowing through $C_{r2}$ and $D_s$ always equals the sum of currents flowing through $C_{r1}$, S, and $D_p$ when said converter is operatively connected to said power source.

2. The variable frequency, zero-voltage switched, multi-resonant converter of claim 1 wherein said switch means comprises semi-conductor means.

3. The variable frequency, zero-voltage switched, multi-resonant converter of claim 1 wherein said switch means comprises bi-polar transistor means.

4. The variable frequency, zero switched, multi-resonant converter of claim 1 wherein said switch means comprises FET means.

5. The variable frequency, zero voltage switched, multi-resonant converter of claim 1 wherein said switch means and said first diode comprises MOSFET means.

6. The variable frequency, zero voltage switched, multi-resonant converter of claim 1 wherein said switch means comprises IGBT means.

* * * * *